(12) United States Patent
Ohashi et al.

(10) Patent No.: US 9,623,871 B2
(45) Date of Patent: Apr. 18, 2017

(54) POWER TRANSMITTING APPARATUS

(71) Applicant: KABUSHIKI KAISHA F.C.C., Hamamatsu-shi, Shizuoka (JP)

(72) Inventors: Tatsuyuki Ohashi, Hamamatsu (JP); Jun Ishimura, Hamamatsu (JP); Atsuho Ota, Hamamatsu (JP); Kaoru Iida, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 14/802,416

(22) Filed: Jul. 17, 2015

(65) Prior Publication Data

US 2015/0321674 A1 Nov. 12, 2015

Related U.S. Application Data

(63) Continuation of application No. PCT/JP2014/050783, filed on Jan. 17, 2014.

(30) Foreign Application Priority Data

Jan. 17, 2013 (JP) .................................. 2013-006227

(51) Int. Cl.
*B60W 10/06* (2006.01)
*B60W 30/188* (2012.01)
(Continued)

(52) U.S. Cl.
CPC ........ *B60W 30/188* (2013.01); *B60W 10/023* (2013.01); *B60W 10/026* (2013.01);
(Continued)

(58) Field of Classification Search
USPC ...................................................... 180/65.28
See application file for complete search history.

(56) References Cited

U.S. PATENT DOCUMENTS

| 6,352,489 B1 * | 3/2002 | Kuroda | .................... | B60K 6/48 180/65.25 |
| 7,037,234 B2 * | 5/2006 | Kahlon | .................... | B60K 6/24 477/167 |

(Continued)

FOREIGN PATENT DOCUMENTS

| JP | H02-159420 | 6/1990 |
| JP | H03-189449 | 8/1991 |

(Continued)

*Primary Examiner* — Dirk Wright
(74) *Attorney, Agent, or Firm* — Knobbe, Martens, Olson & Bear, LLP

(57) ABSTRACT

A power transmitting apparatus can be configured to restart an engine when the acceleration pedal is actuated in an assist-start engine speed range and can improve responsiveness of engine restart. Such a power transmitting apparatus of a vehicle can provided with a clutch for selectively transmitting or cutting off a driving power of an engine to wheels. The power transmitting apparatus can comprise an assist-controller configured to increase an engine rotational speed above an self-start rotational speed by actuating the clutch when the vehicle is decelerated and fuel supply to the engine is stopped, in response to operation of an acceleration pedal of the vehicle, when the engine rotational speed is in an assist-start range which is an engine rotational speed range lower than the self-start rotational speed and higher than a starter-start rotational speed in which the engine cannot be started by a starter.

11 Claims, 20 Drawing Sheets

(51) Int. Cl.
*F16H 45/02* (2006.01)
*F02D 41/12* (2006.01)
*B60W 10/02* (2006.01)
*B60W 30/18* (2012.01)
*B60W 30/192* (2012.01)
*F16D 48/06* (2006.01)
*F16D 21/06* (2006.01)
*F16H 45/00* (2006.01)
*F02N 19/00* (2010.01)
*F02D 41/02* (2006.01)
*F02D 41/04* (2006.01)
*F02D 41/06* (2006.01)
*F02N 99/00* (2010.01)

(52) U.S. Cl.
CPC ...... *B60W 10/06* (2013.01); *B60W 30/18072* (2013.01); *B60W 30/192* (2013.01); *F02D 41/126* (2013.01); *F16D 48/062* (2013.01); *F16H 45/02* (2013.01); *B60W 2540/10* (2013.01); *B60W 2710/021* (2013.01); *B60W 2710/0644* (2013.01); *F02D 41/022* (2013.01); *F02D 41/042* (2013.01); *F02D 41/065* (2013.01); *F02N 99/006* (2013.01); *F02N 2019/002* (2013.01); *F16D 2021/0661* (2013.01); *F16D 2500/1085* (2013.01); *F16D 2500/1088* (2013.01); *F16D 2500/3056* (2013.01); *F16D 2500/3067* (2013.01); *F16D 2500/3108* (2013.01); *F16D 2500/31453* (2013.01); *F16D 2500/50227* (2013.01); *F16D 2500/50883* (2013.01); *F16D 2500/70426* (2013.01); *F16D 2500/70452* (2013.01); *F16H 2045/002* (2013.01); *F16H 2045/0205* (2013.01); *F16H 2045/0231* (2013.01); *F16H 2045/0294* (2013.01); *Y02T 10/48* (2013.01)

(56) References Cited

U.S. PATENT DOCUMENTS 7,533,746 B2 *  5/2009  Yamaguchi ........... H02J 7/1423
                                                180/65.28
8,496,561 B2 *  7/2013  Bucknor ................. B60K 6/48
                                                   477/5
8,874,292 B2 * 10/2014  Yamazaki ............... B60K 6/48
                                                  701/22

FOREIGN PATENT DOCUMENTS

| JP | 2006-002899 | 1/2006 |
| JP | 2010-084828 | 4/2010 |
| JP | 2011-117531 | 6/2011 |
| JP | 2011-190819 | 9/2011 |
| JP | 2012-097843 | 5/2012 |

* cited by examiner

| Control mode | | ON – OFF | | Damper clutch |
|---|---|---|---|---|
| | | Solenoid 22 | Solenoid 23 | |
| Mode 1 | Low spring rate state | ○ | ○ | OFF |
| Mode 2 | Slip control | ○ | × | Control (Linear solenoid 25) |
| Mode 3 | High spring rate state | ○ | × | ON (Linear solenoid 25) |

Fig. 9

| | I | II | III | IV |
|---|---|---|---|---|
| Engine rotational speed | ~ Nc | Nc ~ Nb | Nb ~ Nd | Nd ~ |
| Second clutch means | Slip control | Slip control | Slip control | OFF |
| Damper clutch state at engine start | OFF (Low spring rate) | ON (High spring rate) | ON (High spring rate) | ON (High spring rate) |
| Method of engine start | Self-start | Assist → Self start | Starter-start | Starter-start |

Fig. 15

POWER TRANSMITTING APPARATUS

INCORPORATION BY REFERENCE TO ANY PRIORITY APPLICATIONS

Any and all applications for which a foreign or domestic priority claim is identified in the Application Data Sheet as filed with the present application, or any corrections thereto, are hereby incorporated by reference under 37 CFR 1.57.

BACKGROUND OF THE INVENTION

Field of the Invention

The present inventions relate to power transmitting apparatuses which can arbitrarily and/or selectively transmit or cut off driving power of an engine to or from wheels of a vehicle.

Description of the Related Art

Some conventional power transmitting apparatuses ("automatic transmissions") for motor vehicles include a torque converter (so-called "torque converter type" starting system) and some include a starting clutch (so-called "start-clutch type" starting system). In the torque converter type automatic power transmitting apparatuses, it is possible to improve the starting performance at the time of start due to the torque amplification function of the torque converter. On the other hand, in the start-clutch type automatic power transmitting apparatuses, it is possible to improve the power transmitting efficiency since it does not have slippage during the steady running of vehicle which is caused by the apparatus of the torque converter type.

As described above, in the torque converter type automatic transmission, although it has a technological advantage of improvement of the starting performance at the time of start due to the torque amplification function of the torque converter, it has a technological disadvantage of reduction of the power transmitting efficiency due to slippage of the torque converter. On the other hand, in the automatic transmission of the start-clutch type, although it has a technological advantage of improvement of the power transmitting efficiency during the steady running of vehicle since it does not have slippage peculiar to the torque converter type, it has a technological disadvantage of reduction of the starting performance since it does not have the torque amplifying function of the torque converter and thus it is necessary to increase the reduction ratio of the transmission to prevent reduction of the starting performance.

In order to solve these defects of the prior art, Japanese Patent Document JP 2010-84828 A describes a power transmitting apparatus which is provided with a clutch for switching a first power transmitting system for transmitting the driving power of the engine to wheels via a torque converter and a second power transmitting system for transmitting the driving power of the engine to wheels without via a torque converter and is able to satisfy both the functions of improving the starting performance due to the torque amplifying function of the torque converter and of improving the power transmitting efficiency during the steady running of vehicle.

Some motor vehicles include an idling-stop control for automatically stopping the engine when a vehicle is stopped in order to improve the fuel consumption. Additionally, some motor vehicles include a control for stopping fuel supply (fuel cutoff) to the engine when the engine speed is dropped below the idling rotation (hereinafter referred to as "economic-running control"). That is, the economic-running control improves fuel consumption by continuing the stop of fuel injection to the engine to reduce the fuel consumption until a vehicle is stopped when the engine rotational speed is dropped below the idling rotational speed while the vehicle is decelerated.

However, with such systems, the engine does not always restart upon restarting of fuel supply, for example, if fuel supply is restarted when the acceleration pedal depressed by a driver during the economic-running control is performed (that is, when the engine speed is in a state below the idling speed due to the fuel cutoff). That is, when the engine is in a rotational speed range (such a rotational speed range is hereinafter referred to as "assist-start range") lower than a speed in which the engine can be started if fuel supply is restarted (such a rotational speed is hereinafter referred to as "self-start rotational speed") and higher than a speed in which the engine cannot be started even if fuel supply is restarted and can be started only by a starter (such a rotational speed is hereinafter referred to as "starter-start rotational speed"), there would be caused a problem that the engine cannot be started until its rotational speed is dropped below the starter-start rotational speed and thus its restart response is impaired.

Japanese Patent Document JP 2012-97843 A describes switching the driving power of the engine to the second power transmitting system in which the driving power is transmitted to wheels without via the torque converter by actuating a lock-up clutch and to hold the engine at a speed higher than the self-start rotational speed or lower than the starter-start rotational speed. This reduces a length of the time of the assist-start range during the economic-running control and thus prevents deterioration of the engine restart response to some extent.

SUMMARY OF THE INVENTIONS

Although the power transmitting apparatus of the prior art described above can suppress deterioration of the engine restart response to some extent by holding the engine at a speed higher than the self-start rotational speed or lower than the starter-start rotational speed, an engine still must pass through the assist-start range in the process of deceleration of the vehicle, for example, during economic-running control, even if it is only a short time. Accordingly, the engine cannot be restarted until it reaches the starter-start rotational speed when the acceleration pedal operation is performed in the assist-start range and thus improvement of the responsivity of engine restart can still be improved.

Thus, it can be beneficial to provide a power transmitting apparatus which can quickly restart the engine even when the acceleration pedal operation is performed in the assist-start range and accordingly further improve the engine restart responsiveness.

Thus, in some embodiments, a power transmitting apparatus of a vehicle can include a clutch for selectively transmitting or cutting off a driving power of an engine to wheels. The power transmitting apparatus can comprise an assist-controller configured to increase an engine rotational speed above an self-start rotational speed by actuating the clutch when the vehicle is decelerated and fuel supply to the engine is stopped, in response to an acceleration pedal operation of the vehicle when the engine rotational speed is in an assist-start range which is an engine rotational range lower than the self-start rotational speed in which the engine can be started if fuel supply is restarted and higher than a starter-start rotational speed in which the engine cannot be started by a starter.

In some embodiments, the power transmitting apparatus further comprises a torque converter, wherein the clutch switches a power transmitting system between a first power transmitting system for transmitting the driving power of the engine to the wheels via the torque converter and a second power transmitting system for transmitting the driving power of the engine to the wheels without via the torque converter, and wherein the assist-controller increases the engine rotational speed above the self-start rotational speed by switching the power transmitting system to the second power transmitting system by actuating the clutch when the vehicle is decelerated and fuel supply to the engine is stopped, in response to the acceleration pedal operation of the vehicle when the engine rotational speed is in the assist-start range.

In some embodiments, the assist-controller estimates a control-start vehicle speed which is a vehicle speed in which the engine rotational speed above the self-start rotational speed can be obtained by actuating the clutch in the assist-start range and also decreases the engine rotational speed by actuating the clutch when the vehicle speed has reached the control-start vehicle speed during deceleration of the vehicle.

In some embodiments, the control-start vehicle speed is estimated depending on the deceleration of the vehicle.

In some embodiments, the power transmitting apparatus comprises a damper mechanism comprising at least first and second dampers having the spring properties for damping the torque variation and disposed in the middle of the power transmitting system of the engine; a spring property switching device for switching the spring properties of the damper mechanism; a spring property controller for actuating the spring property switching device to switch the spring properties to that depended on the running state of the vehicle, and wherein the spring constant of the damper mechanism can be switched between a low spring rate state and a high spring rate state and the assist-controller switches the spring properties to the high spring rate state when the vehicle has reached the control-start vehicle speed.

In some embodiments, the spring constant of the damper mechanism is switched depending on the throttle opening of the engine when the acceleration pedal operation has been performed in the assist-start range.

In some embodiments, the clutch is capable of a slip control for slipping the clutch in the process of switching the connection and the cutting-off of the power transmission systems of the engine and is slip controlled in the assist start range.

In some embodiments, the assist-controller performs the restart of fuel supply to the engine and simultaneous actuation of an ignition of the engine after the clutch has been actuated in the assist-start range and before the engine rotational speed reaches the self-start rotational speed.

In some embodiments, the assist-controller actuates the clutch in the assist-start range only when the temperature of hydraulic oil for actuating the clutch is higher than a predetermined temperature.

In some embodiments, a transmission is disposed in the middle of the power transmitting system from the engine to the wheels and the transmission is an automatic variable speed transmission.

In some embodiments, the automatic variable speed transmission is a continuously variable transmission.

According to some embodiments, since the power transmitting apparatus comprises an assist-controller and the assist-controller increases an engine rotational speed above an self-start rotational speed by actuating the clutch when the vehicle is decelerated and fuel supply to the engine is stopped, in response to an acceleration pedal operation of the vehicle when the engine rotational speed is in an assist-start range which is an engine rotational range lower than the self-start rotational speed in which the engine can be started if fuel supply is restarted and higher than a starter-start rotational speed in which the engine cannot be started by a starter, it is possible to quickly restart the engine and to improve its responsiveness.

According to some embodiments, since the clutch switches a power transmitting system between a first power transmitting system for transmitting the driving power of the engine to the wheels via the torque converter and a second power transmitting system for transmitting the driving power of the engine to the wheels without via the torque converter, and the assist-controller increases the engine rotational speed above the self-start rotational speed by switching the power transmitting system to the second power transmitting system by actuating the clutch when the vehicle is decelerated and fuel supply to the engine is stopped, in response to the acceleration pedal operation of the vehicle when the engine rotational speed is in the assist-start range, it is possible to quickly restart the engine and to improve its responsiveness using the switching function of the first and second power transmitting systems by the clutch even when the acceleration pedal operation is performed in the assist-start range.

According to some embodiments, since the assist-controller estimates a control-start vehicle speed which is a vehicle speed in which the engine rotational speed above the self-start rotational speed can be obtained by actuating the clutch in the assist-start range and also decreases the engine rotational speed by actuating the clutch subject to that the vehicle speed has reached the control-start vehicle speed during deceleration of the vehicle, it is possible to better restart the engine in the assist-start range.

According to some embodiments, since the control-start vehicle speed is estimated depending on the deceleration of the vehicle, it is possible to surely and smoothly perform the restart of engine in the assist-start range.

According to some embodiments, since the spring constant of the damper mechanism can be switched between a low spring rate state and a high spring rate state and the assist-controller switches the spring properties to the high spring rate state subject to that the vehicle has reached the control-start vehicle speed, it is possible to better prevent generation of resonance.

According to some embodiments, since the spring constant of the damper mechanism is switched depending on the throttle opening of the engine when the acceleration pedal operation has been done in the assist-start range, it is possible to set proper spring property depending on the running state.

According to some embodiments, since the clutch is capable of slip control for slipping the clutch in the process of switching the connection and the cutting-off of the power transmission systems of the engine and is slip-controlled in the assist start range, it is possible to improve the responsiveness of the clutch when the acceleration pedal operation is performed in the assist-start range and to further improve the responsiveness with quickly performing restart of the engine.

According to some embodiments, since the assist-controller performs the restart of fuel supply to the engine and simultaneous actuation of an ignition of the engine after the clutch has been actuated in the assist-start range and before the engine rotational speed reaches the self-start rotational speed, it is possible to obtain an auxiliary driving power of the engine while the engine reaches the self-start rotational speed and thus to restart the engine more quickly.

According to some embodiments, since the assist-controller actuates the clutch in the assist-start range only when the temperature of hydraulic fluid for actuating the clutch is higher than a predetermined temperature, it is possible to better prevent operational failure of the clutch when hydraulic fluid is in low temperature.

According to some embodiments, it is possible to easily apply embodiments of the present inventions to popular vehicles in which a transmission is disposed in the middle of the power transmitting system from the engine to the wheels and the transmission is formed of an automatic variable speed transmission, particularly a continuously variable transmission.

BRIEF DESCRIPTION OF THE DRAWINGS

FIG. 9 is a table showing a control of the clutch means and a spring property switching means of the power transmitting apparatus of FIG. 1;

FIG. 15 is a table showing contents of control of the power transmitting apparatus of FIG. 1;

DETAILED DESCRIPTION OF THE PREFERRED EMBODIMENT

Preferable embodiments including various combinations of the present inventions are described below with reference to the accompanying drawings.

Figure 1:
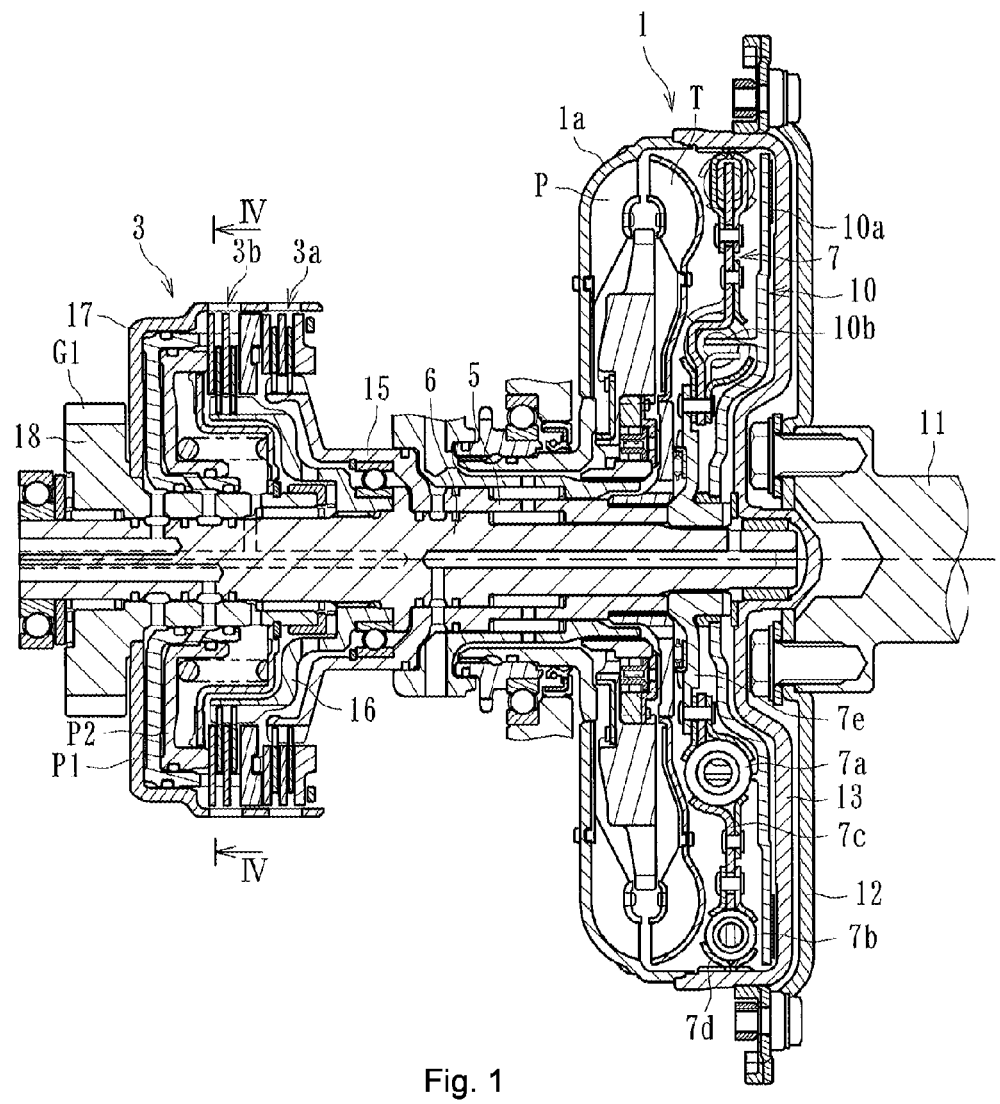
FIG. 1 is a longitudinal section view of a power transmitting apparatus of a preferable embodiment of the present invention.
Figure 2:
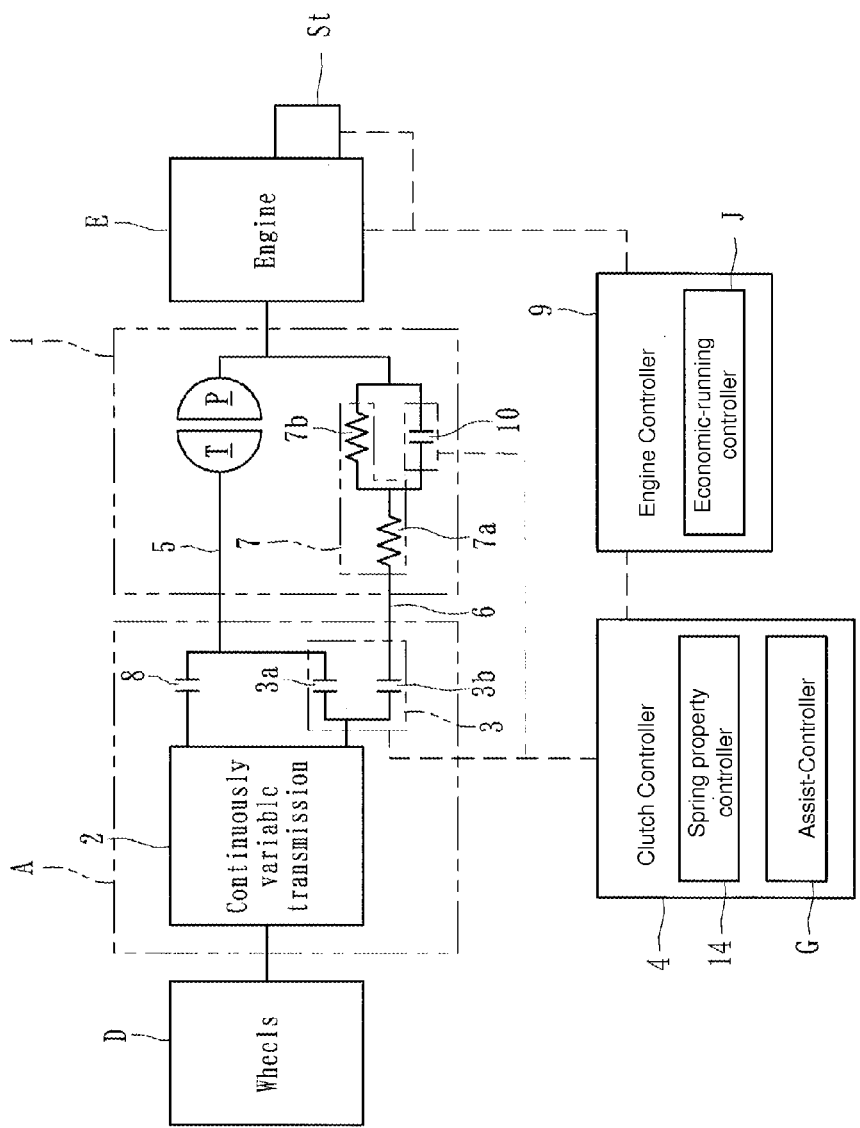
FIG. 2 is a schematic view showing basic concept of the power transmitting apparatus of FIG. 1.

A power transmitting apparatus, in accordance with some embodiments, can be configured to transmit and cut off driving power from an engine (source of driving power) of a vehicle (e.g., an automobile) to and from wheels (driving wheels). The power transmitting apparatus can comprise, as shown in FIGS. 1 to 5, a torque converter 1, a clutch 3 which can be considered as a clutch means and can be configured to arbitrarily and selectively transmit (when "engaged") and cutting off (when "disengaged") the driving power of the engine E to and from the wheels D, a damper mechanism 7, a damper clutch 10 (which can serve as a spring property switching means), and a spring property control device 14. FIG. 1 is a longitudinal section view showing a main part of the power transmitting apparatus of some embodiments, and FIG. 2 is a schematic view showing a basic concept of the power transmitting apparatus of some embodiments.

As shown in FIG. 2, the torque converter 1 and a transmission A are arranged in the middle of the power transmitting system from the engine E to the wheels D. The transmission A includes a CVT (Continuous Variable Transmission) 2 other than the clutch 3 and a third clutch 8, which can also be considered as a clutch means 8. A numeral 11 (FIG. 1) denotes an input shaft extending from the engine E (FIG. 2).

The torque converter 1 has torque amplifying function for amplifying a torque from the engine E and transmits it to the CVT 2. The torque converter 1 mainly comprises torque converter covers 1a, 13 containing therein hydraulic fluid in a sealed manner and rotated around their axes by the driving power of the engine E, a pump P formed on the cover 1a and rotated together with the cover 1a, and a turbine T arranged oppositely to the pump P and rotatable at a side of the cover 13.

The input shaft 11 is connected to the torque converter cover 13 via a cover member 12. When the input shaft 11, the cover member 12, the torque converter covers 13, 1a and the pump P are rotated, the rotational torque can be transmitted to the turbine T via liquid (hydraulic fluid) and can be amplified. Then a first driving shaft 5 spline-engaged with the turbine T is rotated and thus the torque is transmitted to the CVT 2 (first power transmitting system). The "first power transmitting system for transmitting the driving power of the engine E to the wheels D via the torque converter 1" in the present disclosure can be considered as a driving power transmitting system comprising the torque converter cover 1a, the pump P, the turbine T and the first driving shaft 5.

On the other hand, the damper mechanism 7 is formed of dampers having spring properties for damping torque variation and disposed in the middle of the second power transmitting system. In some embodiments, the damper mechanism 7 comprises two dampers, for example, including first dampers 7a and second dampers 7b, connection part 7d projected radially inwardly from the inner circumference of the torque converter cover 13, connection member 7c connected to the connection part 7d via the second dampers 7b. The connection member 7c is connected to the connection part 7e via the first dampers 7a and the inner circumference of the connection part 7e is spline-engaged with the outer circumference of a second driving shaft 6. In the damper mechanism 7 of some embodiments, a plurality of the first dampers 7a and the second dampers 7b are coaxially arranged (the first dampers 7a being arranged at radially inward and the second dampers 7b at radially outward).

Thus, the driving torque of the engine E can be transmitted to the CVT 2 with the cover member 12, the torque converter cover 13, the connection member 7c and the second driving shaft 6 being rotated when the input shaft 11 is rotated by the driving power of the engine E (second power transmitting system). In the second power transmitting system, it is possible to transmit the driving power of the engine E to the wheels D via the damper mechanism 7 and the second driving shaft 6 without via the torque converter 1 and also possible to damp the torque variation due to the spring properties of the first dampers 7a and the second dampers 7b. The "second power transmitting system for transmitting the driving power of the engine E to the wheels D without via the torque converter 1" in the present disclosure can be considered as a driving power transmitting system comprising the torque converter cover 13, the connection member 7c and the second driving shaft 6.

As described above, the first driving shaft 5 can be rotated by the driving power of the engine E via the driving transmission system of the torque converter 1 and connected to the first clutch 3a, on the other hand, the second driving shaft 6 can be rotated by the driving power of the engine E without via the driving transmission system of the torque converter 1 and connected to the second clutch 3b. According to some embodiments, the first driving shaft 5 is formed of a hollow cylindrical member and the second driving shaft 6 is rotationally arranged within the first driving shaft 5 coaxially therewith. Accordingly, the first driving shaft 5 and the second driving shaft 6 can be rotated separately and independently each other by selectively actuating the clutch means 3.

Figure 3:
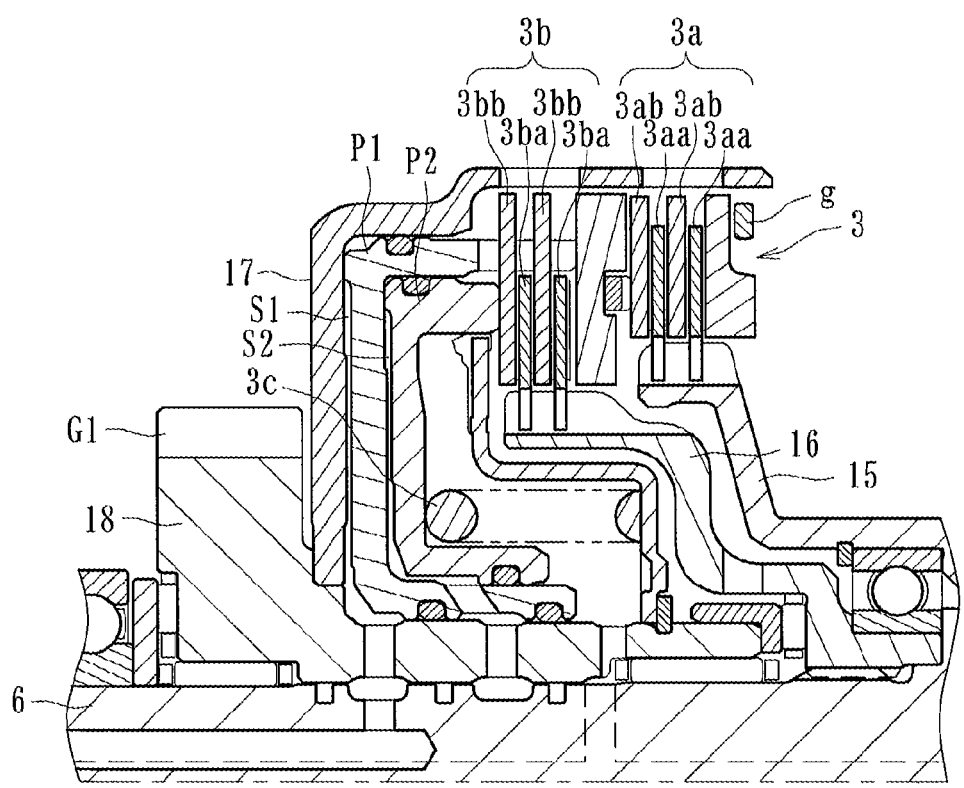
FIG. 3 is a partially enlarged view of the power transmitting apparatus of FIG. 1.

The clutch 3 can be actuated during the forward running of the vehicle and comprises a first clutch 3a for achieving a state of the first power transmitting system for transmitting the driving power of the engine E (driving source) to the wheels D (driving wheels) via the driving transmission system of the torque converter 1 and a second clutch 3b for achieving a state of the second power transmitting system for transmitting the driving power of the engine E (driving source) to the wheels D (driving wheels) without via the driving transmission system of the torque converter 1. As shown in FIG. 3, the first clutch 3a and the second clutch 3b are formed of a plurality of driving-side clutch discs 3aa, 3ba and a plurality of driven-side clutch discs 3ab, 3bb slidable in right and left directions to form a multiple disc clutch. Other clutch designs can also be used.

In the first clutch 3a, the driving-side clutch discs 3aa are mounted on an interlocking member 15 connected to the first driving shaft 5 and interlocking therewith and the driven-side clutch discs 3ab are mounted on an boxy member 17 so that the driving-side clutch discs 3aa and the driven-side clutch discs 3ab are alternately arranged in a laminated arrangement. Thus, mutually adjacent driving-side clutch discs 3aa and driven-side clutch discs 3ab can be press-contacted and separated (release of press-contacting force) each other.

In the second clutch 3b, the driving-side clutch discs 3ba are mounted on an interlocking member 16 connected to the second driving shaft 6 and interlocking therewith and the driven-side clutch discs 3bb are mounted on a boxy member 17 so that the driving-side clutch discs 3ba and the driven-side clutch discs 3bb are alternately arranged to form a laminated arrangement. Thus, mutually adjacent driving-side clutch discs 3ba and driven-side clutch discs 3bb can be press-contacted and separated (release of press-contacting force) each other.

As shown in FIG. 3, the clutch 3 has, within the same boxy member 17, the first clutch 3a and the second clutch 3b, and two hydraulic pistons P1, P2 corresponding respectively to the first clutch 3a and the second clutch 3b, and the first clutch 3a and the second clutch 3b can be arbitrarily and selectively actuated by controlling hydraulic pressures acting on the hydraulic pistons P1, P2.

Figure 4:
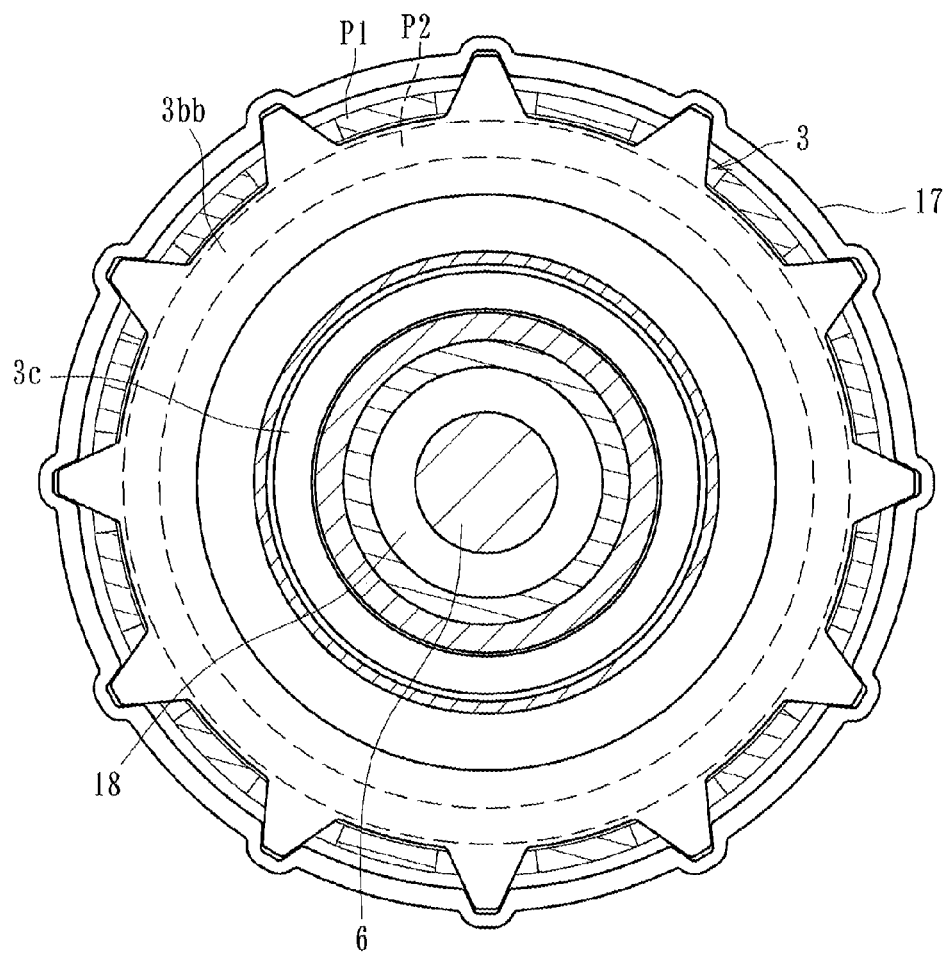
FIG. 4 is a cross-sectional view taken along a line IV-IV of FIG. 1.

That is, the clutch 3 is configured such that the hydraulic piston P1 is moved toward the right (FIG. 3) against urging force of a return spring 3c by introducing hydraulic fluid into a hydraulic chamber S1 between the boxy member 17 and the hydraulic piston P1 and then the tip ends of the hydraulic piston P1 push the first clutch 3a toward the right to press-contact the driving-side clutch discs 3aa and the driven-side clutch discs 3ab each other. In this case, the driving-side clutch discs 3ba and the driven-side clutch discs 3bb are formed with recessed portions along their outer circumferences as shown in FIG. 4 and thus the tip ends of the hydraulic piston P1 can pass through the recessed portions.

Furthermore, the clutch 3 is also configured such that the hydraulic piston P2 is moved toward the right (FIG. 3) against urging force of a return spring 3c by introducing hydraulic fluid into a hydraulic chamber S2 between the hydraulic piston P1 and the hydraulic piston P2 and then the tip end of the hydraulic piston P2 pushes the second clutch means 3b toward the right to press-contact the driving-side clutch discs 3ba and the driven-side clutch discs 3bb to each other. Accordingly, it is possible to arbitrarily and selectively actuate the first clutch 3a or the second clutch 3b by controlling hydraulic pressures for actuating the hydraulic pistons P1, P2. A reference character "g" in FIG. 3 denotes stoppers respectively arranged in relation to the first clutch means 3a and the second clutch means 3b to make them independently actuate.

Figure 7:
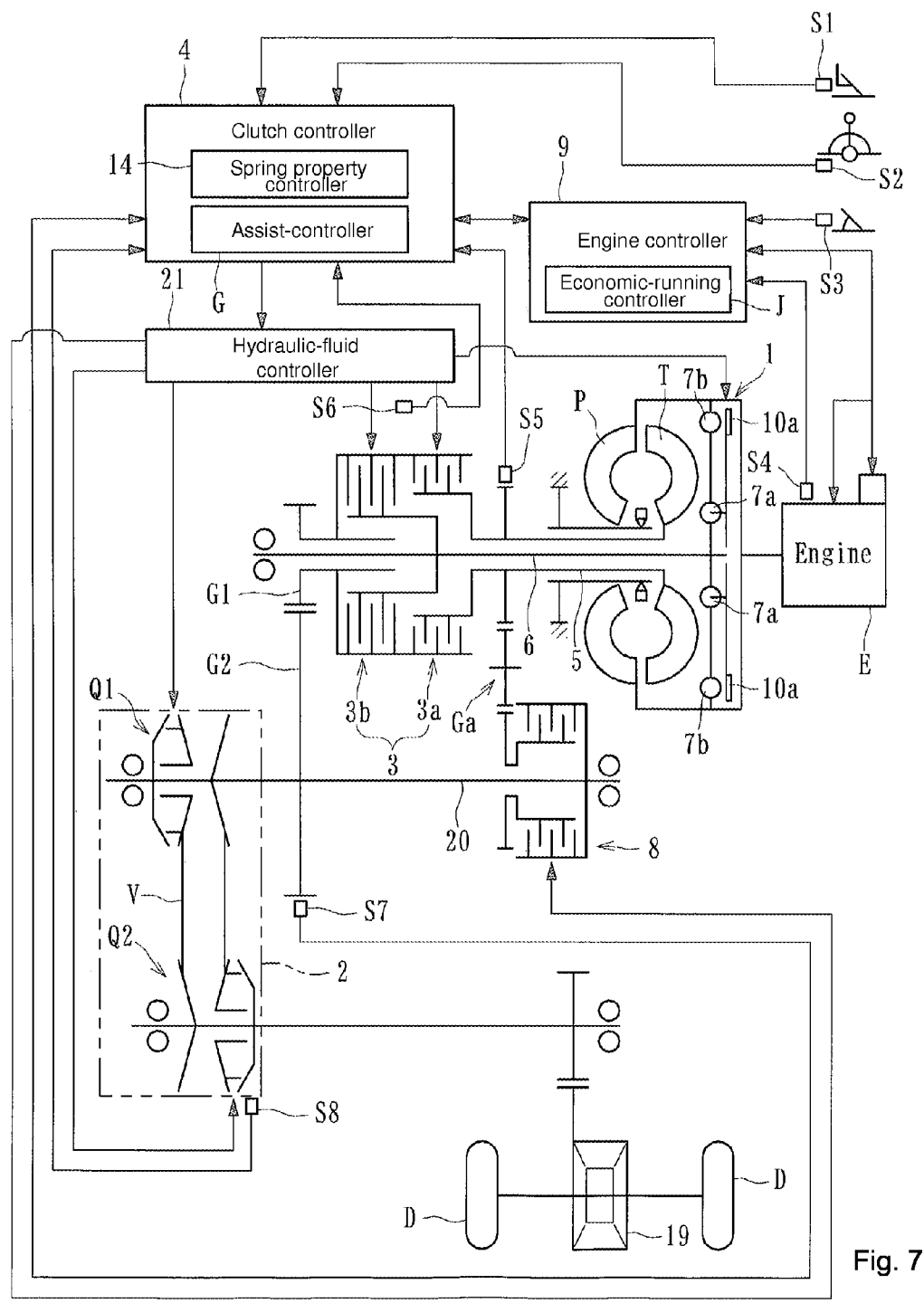
FIG. 7 is a schematic view showing a whole arrangement of the power transmitting apparatus of FIG. 1 including a continuously variable transmission.

The boxy member 17 forming the clutch 3 is connected to an interlocking member 18 formed with a gear G1 which is mated with a gear G2 mounted on an output shaft 20 as shown in FIG. 7. Thus, the driving power of the engine E transmitted from the first clutch 3a or the second clutch 3b is transmitted to the interlocking member 18 via the boxy member 17 and then to the CVT 2 via the output shaft 20.

On the other hand, a third clutch 8 comprises a multiple disc clutch similarly to the first and second clutch 3a, 3b and is configured to transmit the driving power of the engine E to the wheels D via the driving transmission system of the torque converter 1 when the vehicle is in the reverse mode. That is, a gear mounted on the interlocking member 15 is mated with a gear mounted on the output shaft 20 via an idle gear Ga (FIG. 7) arranged therebetween and the driving power of the engine E is transmitted to the third clutch 8 with the rotational direction being reversed when a shift lever (not shown) of the vehicle is operated to the reverse range (R).

The clutch controller 4 (FIGS. 2 and 7), which can be considered as serving as a clutch control means, can be electrically connected to an engine controller (ECU) 9, which can be considered as serving as an engine control means, and arbitrarily and selectively actuate the hydraulic pistons P1 or P2 with introducing hydraulic fluid to the hydraulic chamber S1 or S2 in accordance with the running states (e.g. vehicle speed, inclined angle etc.) of the vehicle to arbitrarily and selectively actuate the first or second clutch 3a or 3b in order to selectively transmit the driving power of the engine E to the wheels D via the driving transmission system of the torque converter 1 (first power transmitting state) or without via the torque converter 1 (second power transmitting state).

Figure 5:
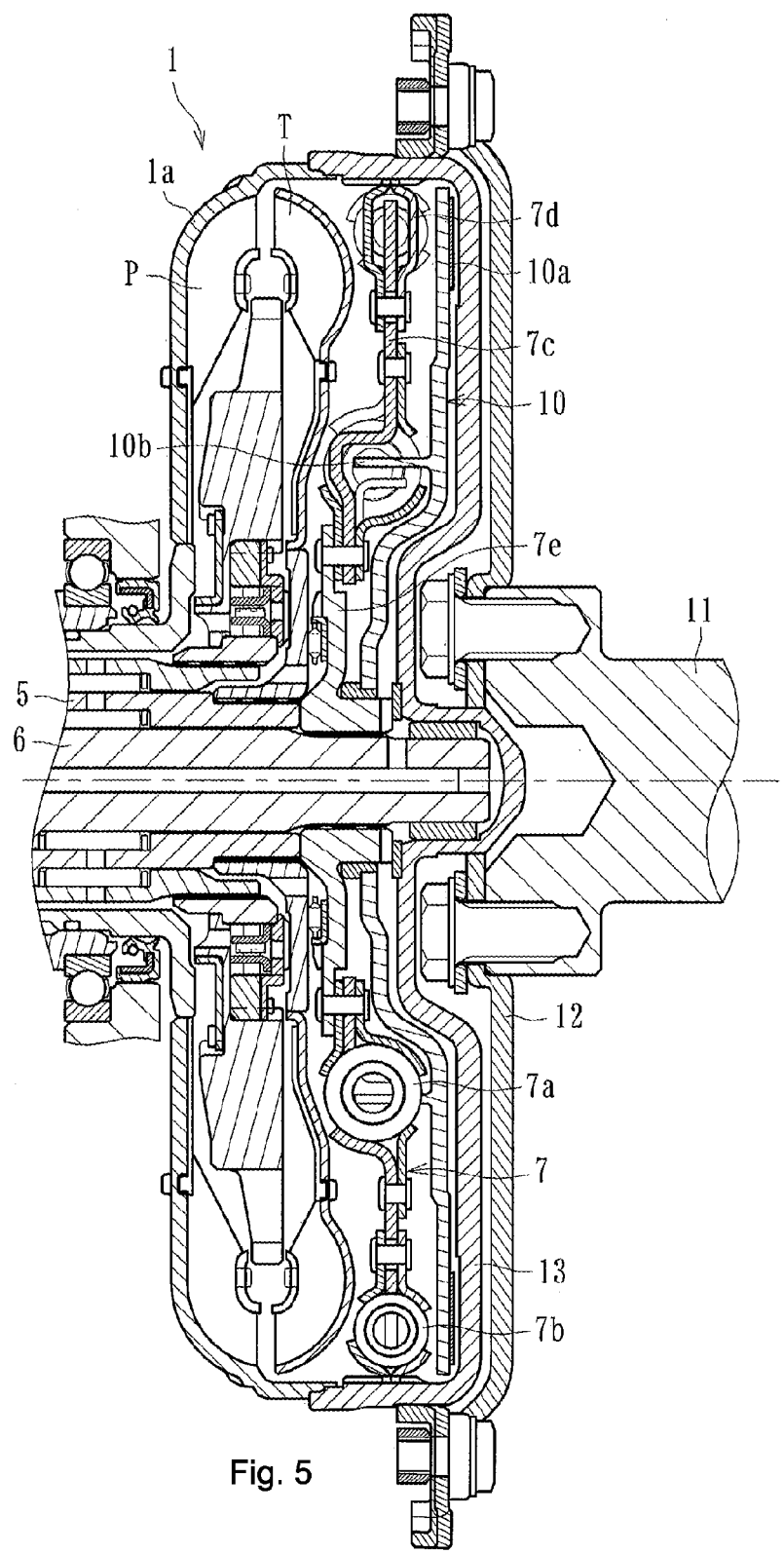
FIG. 5 is an enlarged longitudinal section view showing a torque converter of the power transmitting apparatus of FIG. 1.
Figure 10:
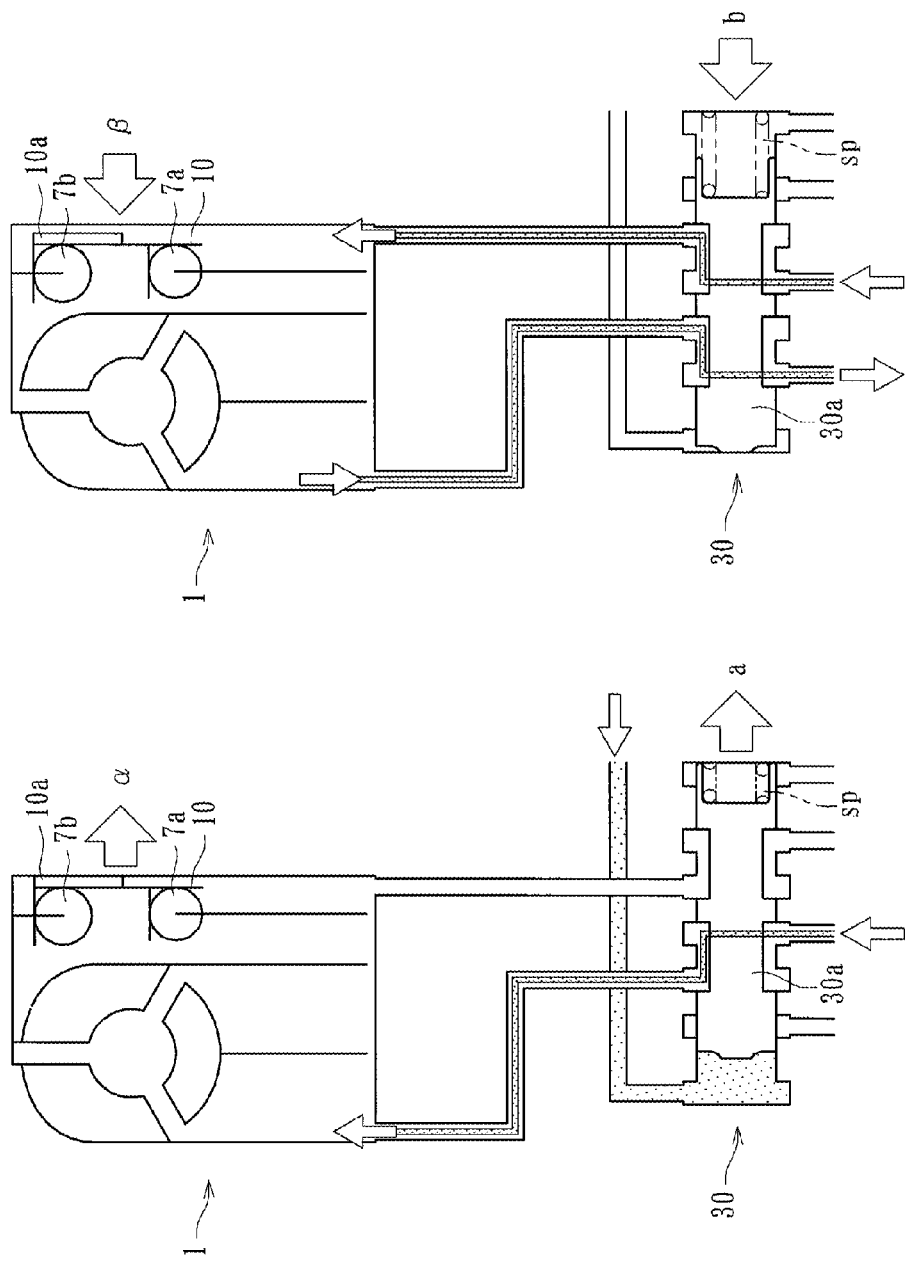
FIGS. 10A and 10B are schematic views showing operations of the spring property switching means of the power transmitting apparatus of FIG. 1.

As shown in FIGS. 5, 10A, and 10B, a damper clutch (spring property switching means) 10 comprises a frictional member 10a mounted on the outer circumference of a disc member and a connecting part 10b formed on the disc member at predetermined positions thereof to be connected to the first damper 7a and can be moved between a connected position (FIG. 10A) in which the frictional member 10a is contacted with the inside surface of the torque converter cover 13 and a separated position (FIG. 10B) in which the frictional member 10a is separated from the inside surface of the torque converter cover 13. That is, as shown in FIGS. 10A and 10B, hydraulic fluid supplied from a hydraulic valve 30 acts on the front side of the damper clutch 10 and moves the damper clutch 10 toward a direction α (FIG. 10A) and thus the damper clutch 10 is switched from the separated position to the connected position. On the other hand, when the hydraulic fluid supplied from the hydraulic valve 30 acts on the back side of the damper clutch 10, the damper clutch 10 is moved to a direction β (FIG. 10B) and thus switched from the contacted position to the separated position.

More particularly, the hydraulic valve 30 comprises a piston member 30a normally urged toward a direction of arrow "b" in FIG. 10B by a spring "sp" and thus the hydraulic fluid supplied to the damper clutch 10 can be circulated at the time of non-operation of a solenoid 22 (SHA) (FIG. 8) and act on the back side of the damper clutch 10 to move the damper clutch 10 to the separated position. On the other hand, when the hydraulic fluid is supplied from the solenoid 22 (SHA) to the hydraulic valve 30, the piston member 30a is moved toward a direction of arrow "a" in FIG. 10A against the urging force of the spring "sp" and thus the hydraulic fluid acts on the front side of the damper clutch 10 to move the damper clutch 10 to the connected position.

When the damper clutch 10 is in the connected position, since the driving power is transmitted from the torque converter cover 13 to the damper clutch 10 via the frictional member 10a, the driving power can be further transmitted to the first damper 7a via the connecting part 10b (FIG. 1) to rotate the second driving shaft 6, during which if the transmitting torque is varied, it will be damped exclusively by the first damper 7a.

On the other hand, when the damper clutch 10 is in the separated position, since the driving power is transmitted from the torque converter cover 13 to the connecting member 7c (FIG. 1), the driving power can be transmitted to the second driving shaft 6 via both the first and second dampers 7a, 7b, during which if the transmitting torque is varied, it will be damped by both the first and second dampers 7a, 7b.

Figure 6:
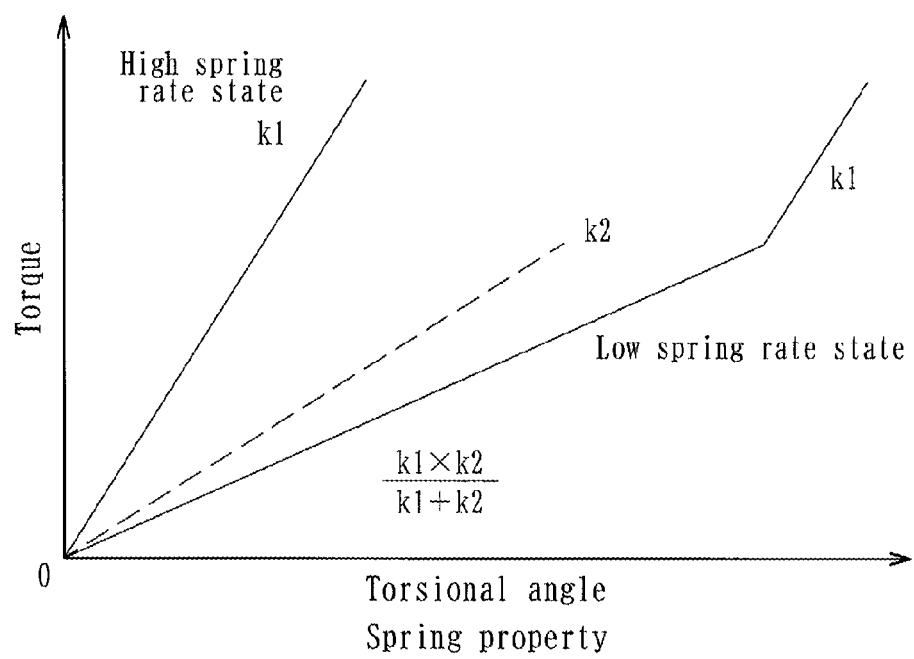
FIG. 6 is a graph showing the spring property of a damper mechanism of the power transmitting apparatus of FIG. 1.

Accordingly, as shown in FIG. 6, when the damper clutch 10 is in the separated position, it is possible to set the second power transmitting system to a low spring rate state by connecting the first damper 7a and the second damper 7b to the second power transmission system in the series (i.e. state of the whole spring constant being expressed as $k1 \cdot k2/(k1+k2)$, wherein $k1$ is the spring constant of the first damper 7a and $k2$ is the spring constant of the second damper 7b) and also possible to set the second power transmitting system to a high spring rate state by connecting only the first damper 7a to the second power transmission system (i.e. state of the whole spring constant being expressed as $k1$ of the spring constant of the first damper 7a).

In the graph of FIG. 6, the ordinate shows a torque and the abscissa shows a torsional angle of the torque converter 13 relative to the second driving shaft 6 (i.e. a displacement of the first and second dampers 7a, 7b in the compressive direction). Although it is described above to have the high spring rate state by connecting only the first damper 7a to the second power transmitting system, it is also possible to have the high spring rate state by connecting either one of the first damper 7a or the second damper 7b to the second power transmitting system (e.g. only the second damper 7b may be connected to the second power transmitting system).

The spring property controller 14 can be included in the clutch controller 4 and can be configured to determine a spring property depending on the running state by actuating the spring property switching device (i.e. the damper clutch 10) in accordance with the running state of the vehicle. That is, since the clutch controller 4 can detect the running state of the vehicle from signals from the engine controller (ECU) 9, it is possible to switch the low spring rate state (state in which the first damper 7a and the second damper 7b are connected in series with a predetermined portion of the second power transmitting system being cut off by the damper clutch 10) and the high spring rate state (state in which only the first damper 7a is connected to the second power transmitting system with a predetermined portion of the second power transmitting system being connected by the damper clutch 10) by actuating the damper clutch 10 (i.e. the spring property switching means) by signals depending on the running state and cutting off or connecting the predetermined portion (i.e. portion in which the damper clutch 10 is arranged in the second power transmitting system).

For example, when the vehicle is running in a deceleration mode and the engine E is rotating at a speed lower than the idling speed, the spring property switching device 14 can switch the damper clutch 10 to the high spring rate state of the connected position in the resonance range with the engine E in the low spring rate, and can switch the damper clutch 10 to the low spring rate state of the separated position in the resonance range with the engine E in the high spring rate.

Such a control enables reduction or prevention of resonance even when the vehicle is running in a deceleration mode and the engine E is rotating at a speed lower than the idling speed and thus to hold the second power transmitting system in a more appropriate condition. In embodiments of the vehicle configured to perform energy regeneration during the deceleration running mode of the vehicle, it is possible to hold the state of second power transmitting system even in the engine speed lower than the idling speed and thus to perform energy regeneration in a wide range of the engine speed.

In addition, the spring property switching device 14 in some embodiments can be configured to control the damper clutch 10 so that it is switched to the low spring rate state of the separated position when the vehicle is in a running state in which the throttle opening is smaller than a predetermined degree and running speed of the vehicle is kept substantially constant or in a running state in which the vehicle is accelerated more gently than a predetermined degree. This makes it possible to better prevent generation of sound within the vehicle and thus to hold the second power transmitting system in a more appropriate condition.

In addition, the spring property switching device 14 in some embodiments can be configured to control the damper clutch 10 so that it is switched to the high spring rate state of the connected position when the vehicle in a running state in which the vehicle is more rapidly accelerated than a predetermined degree. This makes it possible to better prevent generation of a repeating phenomenon of rickety vibration (so-called "jerk" phenomenon) caused during acceleration or deceleration of the vehicle and thus to hold the second power transmitting system in a more appropriate condition.

Furthermore, the spring property switching device 14 in some embodiments can be configured to control the damper clutch 10 so that it is switched to the high spring rate state of the connected position when the engine E is stopped and that the high spring rate state is held when the engine E is started. This makes it possible to better prevent the resonance of the second power transmitting system at start of the engine E. That is, since the resonance tends to be caused more easily at the high spring rate state than at the low spring rate state and at a high engine speed range, generation of the resonance can be better reduced or prevented by setting the high spring rate state at the start of the engine E.

Furthermore, the damper clutch 10 of some embodiments is able to perform slip control for slipping the clutch during switching process (i.e. switching process between the separated state and the connected state of the damper clutch 10 relative to the torque converter 13) of the cutting-off and connection of the predetermined portion of the second power transmitting system. That is, this makes it possible to control of the power transmission capacity by slipping the frictional member 10a of the damper clutch 10 relative to the torque converter cover 13 by adjusting the press-contacting force of the frictional member 10a relative to the inside surface of the torque converter cover 13.

According to some embodiments, since the power transmitting apparatus comprises the damper clutch (i.e. spring property switching device) 10 for arbitrarily switching the spring properties of the damper mechanism 7, and a spring property controller 14 for actuating the spring property switching device 10 to switch the spring properties depending on the detected running state of the vehicle, it is possible to keep the state of the second power transmitting system in a wider range of the engine speed and thus to further improve the fuel consumption.

In addition, since the damper mechanism 7 comprises two dampers, including the first damper 7a and the second damper 7b, and since the damper clutch (spring property switching device) 10 can arbitrarily and selectively connect the first damper 7a and the second damper 7b to switch the spring constant between the low spring rate state and a high spring rate state, it is possible to switch the spring property of the damper mechanism 7 more appropriately and smoothly.

Further according to some embodiments, since the low spring rate state can be obtained by connecting the first and second dampers 7a, 7b in series to the second power transmitting system and the high spring rate state can be obtained by connecting either one of the first damper 7a or second damper 7b to the second power transmitting system, it is possible to more surely and smoothly switch the spring property of the damper mechanism 7.

In addition, according to some embodiments, since the spring property switching device comprises the damper clutch 10 for cutting off or connecting the predetermined portion of the second power transmitting system in accordance with signals from the spring property controller 14, it is possible to more smoothly and surely switch the spring property of the damper mechanism 7. Furthermore, since the damper clutch 10 as the spring property switching device is capable of slip control for slipping clutch in the process of switching the connection and the cutting-off of second power transmitting system at its predetermined portion, it is possible to more smoothly switch the spring property of the damper mechanism 7.

In addition, since the spring property controller 14 includes a predetermined control map to which the control mode can be referred in accordance with a detected running state of the vehicle and thus the damper clutch (spring property switching device) 10 can be controlled in accordance with the control mode of the control map, it is possible to perform more smooth and appropriate switching of the damper mechanism 7. Since the spring property controller 14 is configured to refer to the control map when temperature of the hydraulic fluid of the damper clutch 10 is above a predetermined value, it is possible to prohibit the control in accordance with the control map when the temperature of the hydraulic fluid of the damper clutch 10 is below the predetermined value (i.e. when it is more likely that the operation of the damper clutch 10 cannot be smoothly performed).

In addition, since the damper clutch (spring property switching device) 10 is disposed within the torque converter 1 (more particularly, within torque converter cover 13), it is possible to arbitrarily and efficiently switch the spring property of the damper mechanism 7 and to simplify external structure of the torque converter 1. Furthermore, according to some embodiments, since the transmission A including the torque converter 1 and the transmission (CVT 2) is arranged in the middle of the power transmitting system from the engine E to the wheels D, the clutch 3 is arranged within the transmission A and the transmission comprises an automatic variable speed transmission, it is possible to easily apply the structures disclosed herein to presently popular vehicles in which the transmission is formed of the automatic variable speed transmission and the automatic variable speed transmission is formed of the CVT 2.

Furthermore, according to some embodiments, since the power transmitting apparatus comprises the clutch controller 4 for arbitrarily and selectively actuating the first clutch 3a or the second clutch 3b to transmit the driving power of the engine E to the wheels D via the torque converter 1 (first power transmitting system) or to transmit the driving power of the engine E to the wheels D without via the torque converter 1 (second power transmitting system), it is possible to suppress complication and enlargement of the power transmitting apparatus and to improve the starting performance due to the torque amplifying function of the torque converter and the power transmitting efficiency during the steady running of vehicle.

In addition, since the first and second driving shafts 5, 6 are arranged coaxially each other, the whole size of the power transmitting apparatus can be reduced as compared with a structure in which the first and second driving shafts 5, 6 are arranged in parallel with each other. Furthermore, since the second driving shaft 6 is connected to the engine E via the damper mechanism 7 for damping the torque variation, it is possible to damp vibrations of the engine E transmitted to the second clutch means 3b.

As described above, the transmission A of some embodiments includes the automatic variable speed transmission 2 and the automatic variable speed transmission 2 is formed of a so-called CVT which is arranged in the middle of the power transmitting system from the power source (engine E) of the vehicle to the driving wheels (wheels D) and between the second clutch 3b of the clutch 3 and the wheels D.

As shown in FIG. 7, the CVT 2 comprises two pulleys Q1, Q2 and a belt V extending between the pulleys Q1, Q2 and is structured so that movable sheaves of the pulleys Q1, Q2 are independently actuated by a hydraulic pressure control circuit 21 for controlling the pressure of hydraulic fluid fed from an oil pump 27 (FIG. 8) to vary the belt-running diameters of the pulleys Q1, Q2 to obtain desirable running speeds of the vehicle. The hydraulic pressure control circuit 21 is electrically connected to the clutch controller 4 further electrically connected to a brake switch S1, a position sensor S2 of a shift lever, an engine controller 9 etc. A reference numeral S3 denotes a throttle opening sensor of an acceleration pedal of the vehicle.

As described above, since the CVT 2 is arranged in the middle of the power transmitting system from the engine E of the vehicle to the wheels D and between the second clutch 3b of the clutch 3 and the wheels D, it is possible to let the clutch for advancing the vehicle double as the clutch for transmitting the driving power of the engine E to the wheels W without via the driving transmission system of the torque converter 1 in the second clutch 3b. A reference numeral 19 in FIG. 7 denoted a differential gear of the vehicle. Furthermore, a referential numeral S4 denotes an engine speed sensor for detecting speed of the engine E, numeral S5 denotes a speed sensor for detecting rotational speed of the first driving shaft 5, numeral S6 denotes a hydraulic pressure switch for detecting hydraulic pressure of the clutch 3 (second clutch 3b in the illustrated embodiment), a number S7 denotes a sensor for detecting rotational speed of the second driving shaft 6, and a number S8 denotes a sensor for detecting rotational speed of the counter shaft.

The clutch controller 4 of some embodiments comprise the spring property controller 14 and the damper clutch (spring property switching device) 10 can be actuated via the hydraulic pressure control circuit 21 under control by the spring property controller 14. The clutch controller 4 and the spring property controller 14 are electrically connected to the engine controller (ECU) 9 and are configured to receive electric signals exhibiting the running state of the vehicle from the ECU 9. Accordingly, the spring property controller 14 can actuate the damper clutch 10 at a timing in accordance with the running state of the vehicle based on the received electric signals.

Figure 8:
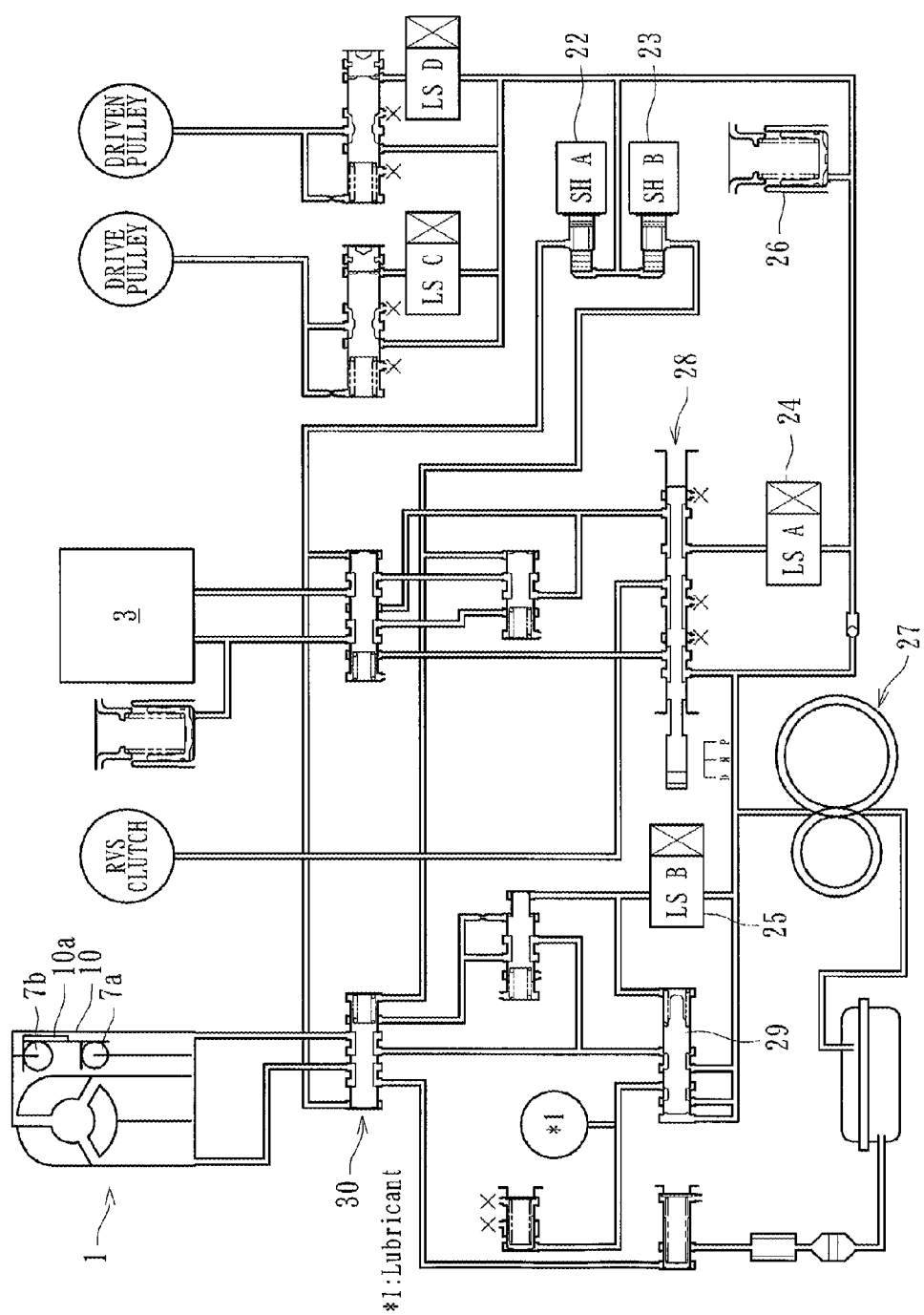
FIG. 8 is a block diagram showing a detailed hydraulic control circuit of the power transmitting apparatus of FIG. 1.

With reference to FIG. 8, the hydraulic pressure control circuit 21 can comprise hydraulic fluid paths and valves for connecting the hydraulic fluid pump 27 and fluid supplying objects (torque converter 1, clutch 3 etc.) and solenoids for opening and closing the valves. A reference numeral 29 denotes a regulator valve for regulating the line pressure, and a reference numeral 25 denotes a linear solenoid (LS B) for controlling the control pressure of the regulator valve 29. A linear solenoid (LS A) 24 can control the clutch pressure of the clutch 3 in the "D" (drive) range and the clutch pressure of a reverse clutch (RVS CLUTCH) in the "R" (reverse) range and the linear solenoid (LS B) 25 can control the line pressure to be regulated by the regulator valve 29. A reference numeral 26 denotes an accumulator, and a reference numeral 28 denotes a manually operated valve for switching hydraulic fluid paths in accordance with shift ranges (P, R, N, D) of the transmission A.

According to some embodiments, a hydraulic pressure valve 30 can be connected to the middle of the flow path from the hydraulic fluid pump 27 to the torque converter 1.

The hydraulic valve 30 is configured to switch the spring property of the damper mechanism 7 between the low spring rate state and the high spring rate state by actuating the damper clutch (spring property switching device) 10. That is, the damper clutch 10 is separated and switched to the low spring rate state when the hydraulic valve 30 occupies a state shown in FIG. 10B based on the control of the spring property controller 14, and the damper clutch 10 is connected and switched to the high spring rate state when the hydraulic valve 30 occupies a state shown in FIG. 10A.

Figure 12:
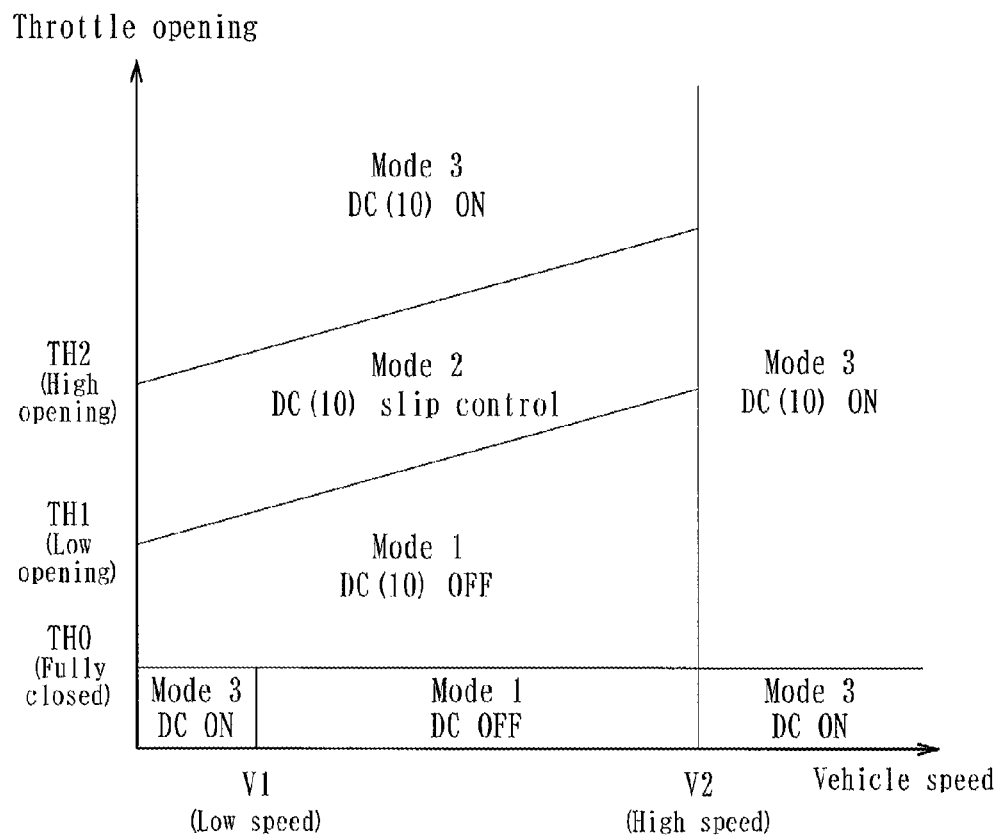
FIG. 12 is a graph showing a control mode of the spring property switching means of the power transmitting apparatus of FIG. 1.

With reference to FIG. 12, the spring property controller 14 can include a stored control map including data or circuitry defining a plurality of control modes (e.g., Modes 1 to 3) corresponding to the running state of the vehicle (the vehicle speed (V) and throttle opening (TH) in some embodiments). According to this control map, a state in which the damper clutch (DC) 10 is OFF is set to Mode 1, a state in which the damper clutch (DC) 10 is slip-controlled is set to Mode 2, a state in which the damper clutch (DC) 10 is ON is set to Mode 3, and a state in which e.g. the vehicle speed (V) is above high speed (V2) is set to Mode 3 irrespective of the throttle opening (TH). In addition, when the vehicle speed (V) is below high speed (V2), a state in which the throttle opening (TH) is above high throttle opening (TH2) is set to Mode 3 and a state in which the throttle opening (TH) is above low throttle opening (TH1) and below high throttle opening (TH2) is set to Mode 2, as well as when the throttle opening (TH) is in fully closed state, a state in which the vehicle speed (V) is below low speed (V1) is set to Mode 3, and a state in which the vehicle speed (V) is above low speed (V1) and below high speed (V2) is set to Mode 1.

As shown in table of FIG. 9, a solenoid (e.g., linear solenoid (LS A) 24 or linear solenoid (LS B) 25) can be actuated by supplying the solenoid pressure to them with controlling the solenoid (SH A) 22 and the solenoid (SH B) 23 in accordance with the referred modes. In this table, marks "o" denote the solenoids being electrically switched "ON" with being supplied with solenoid pressure, and marks "x" denote the solenoids being electrically switched "OFF" with supply of solenoid pressure being stopped.

Figure 11:
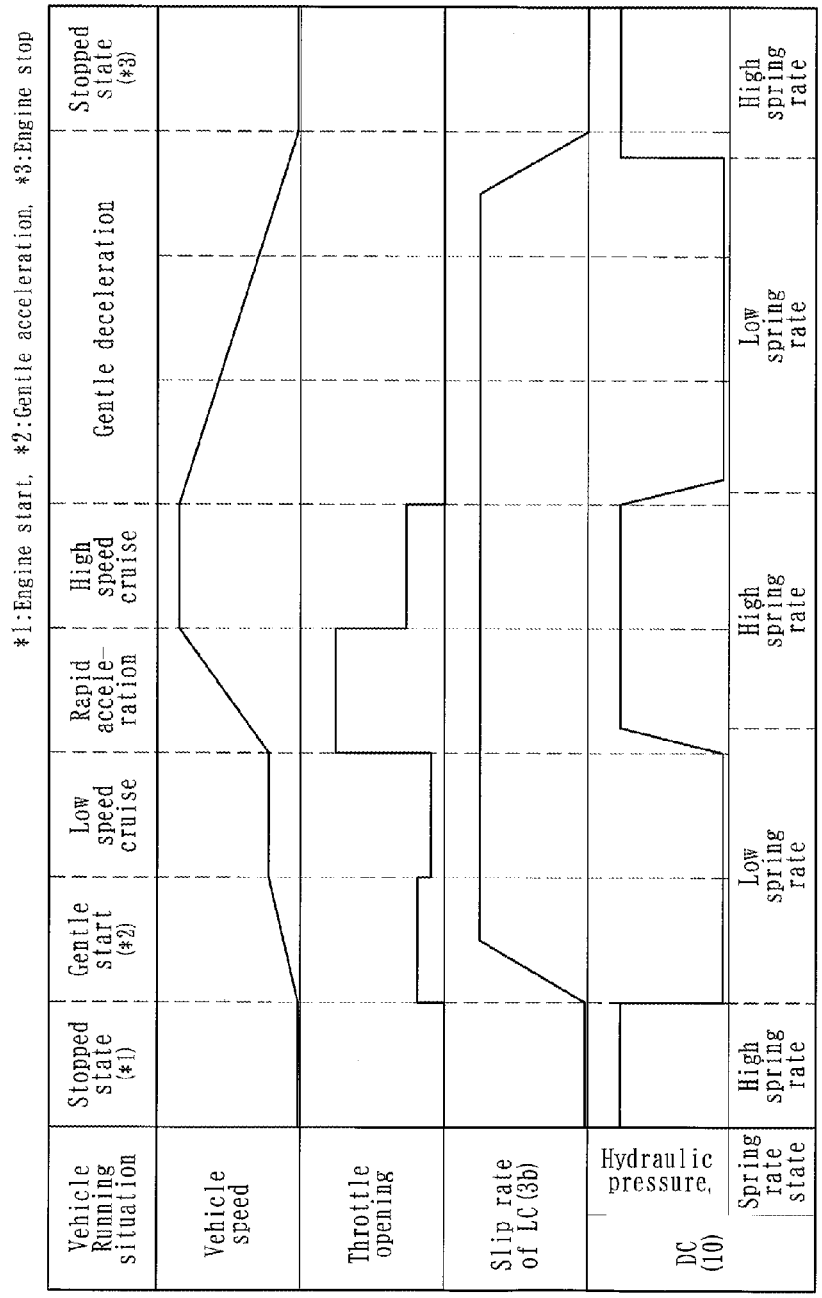
FIG. 11 is a time chart showing operations of the power transmitting apparatus of FIG. 1.

Then, control (i.e. control process or steps of the spring property controller 14) relative to the damper clutch (DC) 10 depending on the running states of the vehicle are described below with reference to the timing chart shown in FIG. 11.

Firstly, the damper clutch (DC) 10 can be held in the connected position and thus in the high spring rate state when the engine is started. That is, for example, the damper clutch 10 can initially be in the connected state and thus in the high spring rate state when the engine had been stopped, and accordingly this high spring rate state is still maintained upon subsequent re-start of the engine E.

In this case, since the hydraulic pump 27 is stopped and the damper clutch 10 does not have the power transmitting capacity when the engine E is in the stopped state, the damper clutch 10 is not in the "high spring rate state" but in "substantially same state as the high spring rate state" although it is in the connected state. That is, the connected state of the damper clutch 10 can be held by hydraulic pressure supplied to the hydraulic valve 30 by the accumulator 26. This can eliminate the necessity of the damper clutch 10 to be switched to the connected state in order to have the high spring rate state on start of the engine E and thus to improve its responsiveness.

Then when the vehicle is gently accelerated ("Gentle start (*2)") by gently operating the acceleration pedal (throttle), the damper clutch (DC) 10 is switched to the separated position and thus the low spring rate state and after this gentle acceleration when the vehicle is held at a substantially constant running speed (i.e. low running speed in a state in which the throttle opening is lower than a predetermined degree, "Low speed cruise"), the damper clutch 10 is held in the separated position and thus in the low spring rate state.

Then when the vehicle is rapidly accelerated by suddenly operating the acceleration pedal ("Rapid acceleration"), the damper clutch (DC) 10 is connected and switched to the high spring rate state after the slip control having been performed. Then when the vehicle runs at a substantially constant speed (high speed running in which the throttle opening is higher degree than a predetermined degree, "High speed cruise"), the damper clutch 10 is held in the connected position and the high spring rate state is kept.

Then when the vehicle is gently decelerated with stopping the acceleration pedal operation ("Gentle deceleration"), the damper clutch DC 10 is moved to the separated position and switched to the low spring rate state after the slip control having been performed, and when the vehicle reaches to the predetermined speed, the damper clutch DC 10 is moved to the connected position and switched to the high spring rate state. According to some embodiments, the damper clutch 10 is controlled so that it is switched to the high spring rate state in a resonance range (range in which the vehicle speed is below a low speed (V1) in FIG. 12) relative to the engine E in the low spring rate state and switched to the low spring rate state in a resonance range (range in which the vehicle speed is above a low speed (V1) and below a high speed (V2) in FIG. 12) relative to the engine E in the high spring rate state when the vehicle is running in a deceleration mode and the engine E is rotating at a speed lower than the idling speed.

The engine controller 9 (FIGS. 2 and 7) of some embodiments is provided with an economic-running controller J which can be configured to perform an idling stop control for automatically stopping the engine E subject to that the vehicle speed has dropped to an extremely low speed state (state in which the vehicle speed is extremely near to zero (0)). The engine controller 9 is electrically connected to a starter St (FIG. 2) for starting the engine E to control the starter St.

The economic-running controller J can be configured to further improve the fuel consumption by performing the economic-running control in addition to the idling stop control with performing the economic-running control for continuing a stop of fuel supply (fuel cut) to the engine E subject to that the engine speed has dropped below the idling speed in the process of deceleration of the vehicle. Although described that the economic-running control is performed subject to that the engine speed has dropped below the idling speed, the economic-running control can be performed even when the engine speed does not reach below the idling speed if fuel supply to the engine E has been stopped during deceleration of the vehicle.

Figure 14:
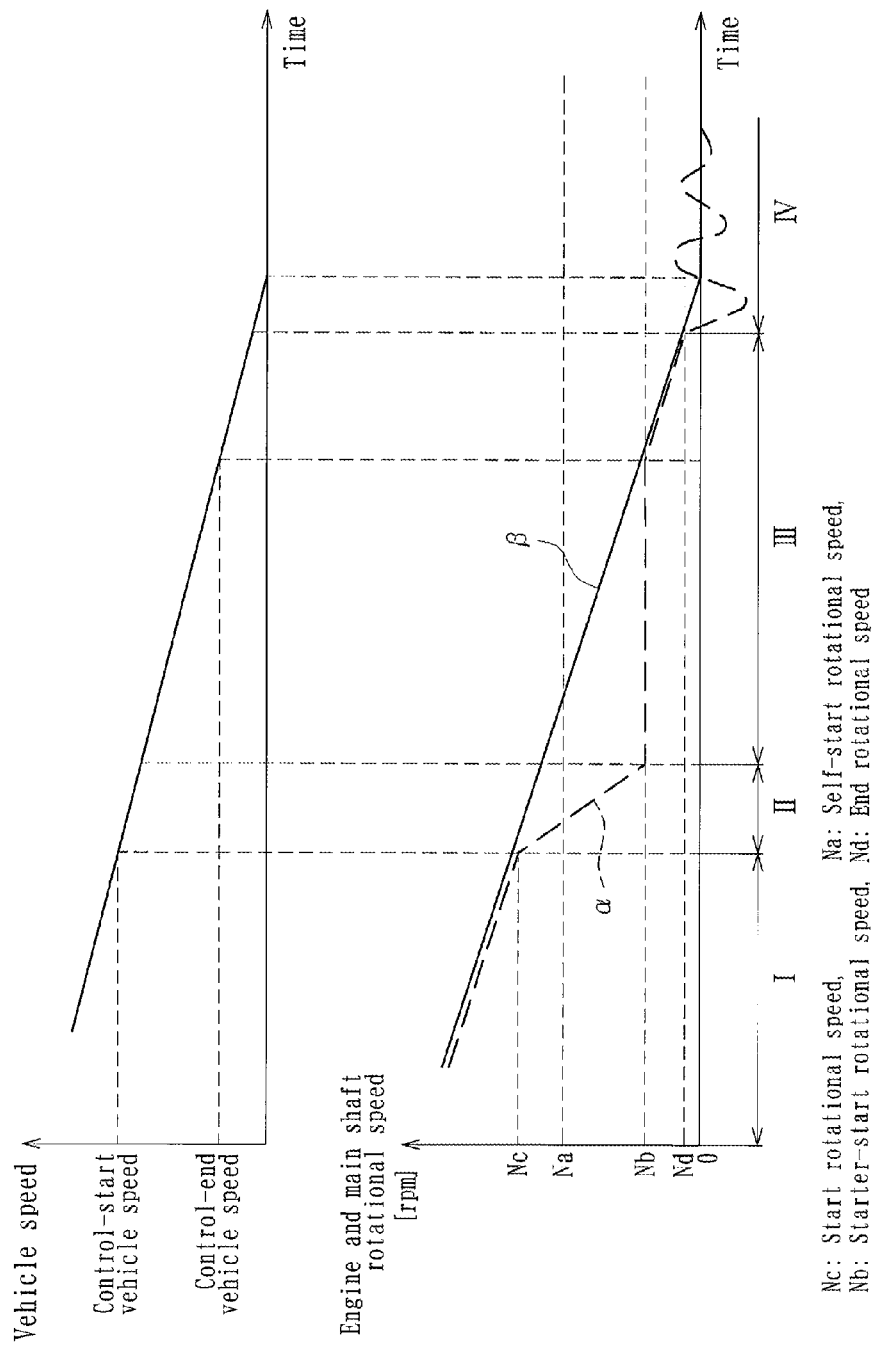
FIG. 14 is a graph showing relations between vehicle speed and time and between engine rotational speed and time of the power transmitting apparatus of FIG. 1.

The economic-running control of some embodiments can not only continue the stop of fuel supply to the engine E even when the engine speed has dropped below the idling speed in the process of deceleration of the vehicle but also as shown in FIG. 14, reduce the engine speed relative to a rotational speed of the main shaft (rotational speed of the output side (boxy member 17) of the clutch means 3) by controlling the clutch 3 when the vehicle has reached to the predetermined speed (control-start speed) during deceleration of the vehicle. That is, as shown in FIG. 15, the damper clutch 10 is switched to the first power transmitting system to reduce the engine speed relative to the main shaft speed (rotational speed of the output side (boxy member 17) of the clutch 3) by the slip control (specifically, control in which the clutch 3 is slipped and the power transmitting capacity is substantially zero (0)) relative to the second clutch 3b subject to that the vehicle speed has reached to the control-start vehicle speed during deceleration of the vehicle.

In FIG. 14, a self-start rotational speed Na (e.g. 500 rpm) of the engine E denotes a speed at which the engine E can be restarted when supply of fuel is restarted without the need to increase the speed of the engine E or to provide torque to the engine E, and a starter-start rotational speed Nb (e.g. 200 rpm) denotes a speed at which the engine E cannot be restarted even when supply of fuel is restarted and can be restarted by the starter St so as to provide additional torque to the engine E and/or increase the speed of the engine E. A mark "α" denotes a rotational speed of the engine E and a mark "β" denotes a rotational speed of the main shaft of the vehicle. In addition, a range between the self-start rotational speed Na and the starter-start rotational speed Nb (i.e. rotational speed range lower than the self-start rotational speed Na and higher than the starter-start rotational speed Nb) denotes an assist-start range. In this assist-start range, since the rotational speed of the engine E is too low to restart the engine E by restarting fuel supply and too high to mesh with the starter St, the assist-start range means an engine speed range in which it would be necessary to wait until the engine E drops below the starter-start speed Nb in order to restart the engine E.

Accordingly as shown in FIG. 14, the rotational speed α of the engine E suddenly decreases from the start rotational speed Nc at a point of time when the vehicle speed reached the control-start vehicle speed and reaches the starter-start rotational speed Nb (interval I to interval II). Then as shown in FIG. 15, the power transmitting ratio due to the second power transmitting system is increased to hold the starter-start rotational speed Nb by the slip control (specifically, control for increasing the power transmitting capacity by reducing a slip amount of the clutch 3) relative to the second clutch 3b (interval III). Finally, the engine rotation is stopped to perform the idling stop by cutting off the second clutch 3b at a point of time when the engine rotational speed becomes substantially same as main shaft rotational speed and reaches the end rotational speed Nd (interval IV).

In addition, the clutch controller 4 of some embodiments is provided with the assist-controller G, which can be considered as serving as an assist-control means. The assist-controller G is configured to control (assist-control) the engine rotational speed, for example, raising the engine rotational speed up to and/or exceeding the self-start rotational speed Na by switching to the second power transmitting system by actuating the clutch 3 in response to operation of the acceleration pedal (e.g., when a user moves the acceleration pedal to increase acceleration) when the engine rotational speed has fallen to the assist-start range (i.e. in the assist-start range) under a condition in which fuel supply to the engine E has been stopped during deceleration of the vehicle.

Figure 16:
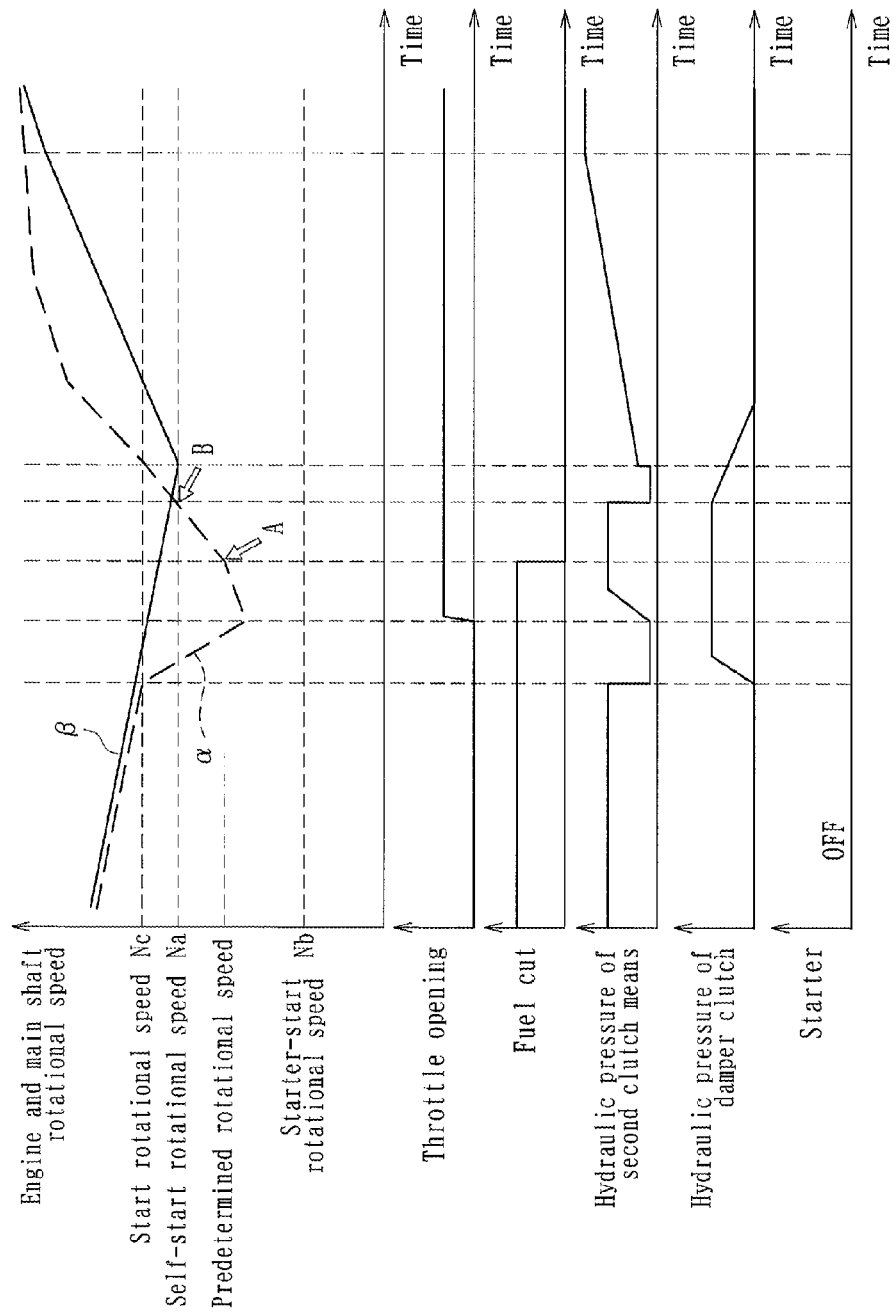
FIG. 16 is a time chart showing contents of control of the power transmitting apparatus of FIG. 1.

For example, as shown in FIG. 16, the engine rotational speed is increased when a driver of the vehicle actuates the acceleration pedal to increase the throttle opening in the assist-start range with the assist-controller actuating the second clutch 3b to be switched to the second power transmitting system. Then, the first explosion is caused by igniting a ignition means (igniting plug) of the engine E with restarting fuel supply to the engine E before the engine rotational speed reaches the self-start rotational speed Na. The engine rotational speed will reach the self-start rotational speed Na at a point of time B by continuing such a state and the engine E will restart (complete ignition, e.g., of all cylinders in a normal cylinder firing order).

Additionally, the assist-controller G of some embodiments can switch the spring constant of the damper mechanism to the high spring rate state by sending signals to the spring property controller 14 when the vehicle has reached the control-start vehicle speed. That is, as shown in FIG. 15, the damper clutch 10 is kept in "OFF" state in the interval I and the spring constant is switched to the high spring rate state by turning the damper clutch 10 to "ON" state during the interval II after the vehicle has reached the control-start vehicle speed.

In addition, the damper clutch 10 can be slip controlled and gradually turned "ON" (high spring rate state) and in the assist-start range gradually turned "OFF" when the throttle opening is increased by acceleration pedal operation of a driver and switched to the low spring rate state. Thereafter, the damper clutch 10 is switched to a spring rate depending on (in response to) a running state of the vehicle as described above.

As described above, according to some embodiments, since the spring constant of the damper mechanism 7 can be switched between a low spring rate state and a high spring rate state and the assist-controller G can switch the spring properties to the high spring rate state in response to the detection that the vehicle has reached the control-start vehicle speed, it is possible to better prevent generation of resonance. In addition, since the spring constant of the damper mechanism 7 is switched depending on the throttle opening of the engine E when the acceleration pedal operation has been done in the assist-start range, it is possible to set proper spring property depending on the running state of the vehicle.

Furthermore according to some embodiments as shown in FIG. 15, the slip control (specifically, control in which the clutch is slipped and the power transmitting capacity is substantially zero (0)) is performed on the second clutch means 3b in the assist-start range (specifically, during the interval II) to improve the responsivity of the clutch means 3 (second clutch means 3b) when acceleration pedal operation is done in the assist-start range. Accordingly, it is possible to quickly restart the engine E and thus to further improve the responsivity of the engine E.

Figure 13:
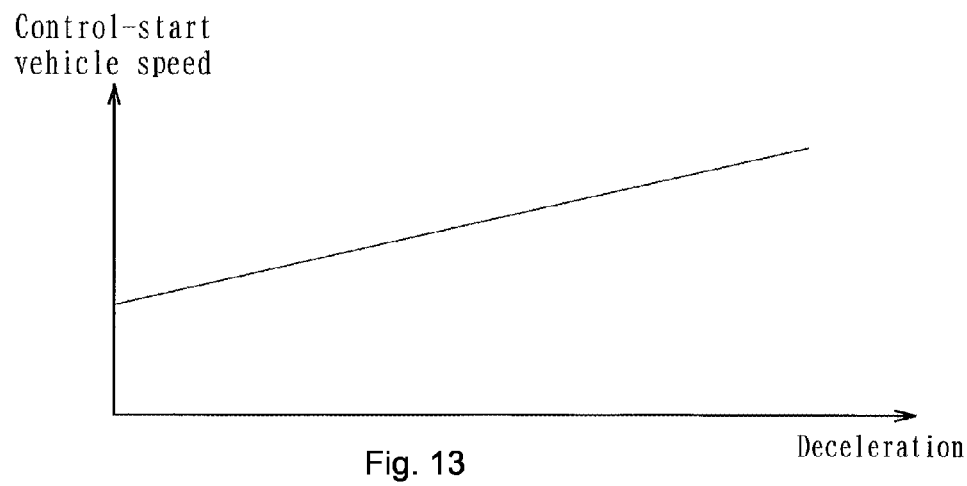
FIG. 13 is a graph showing a control map for estimating the control-start vehicle speed of the power transmitting apparatus of FIG. 1.

The assist-controller G of some embodiments can be configured to estimate the control-start vehicle speed which enables the engine rotational speed higher than the self-start rotational speed Na by switching to the second power transmitting system by actuating the clutch 3 (second clutch 3b) in the assist-start range. For example as shown in FIG. 13, it is possible to estimate the control-start vehicle speed which enables the engine rotational speed higher than the self-start rotational speed Na by actuating the clutch 3 (second clutch 3b) in the assist-start range by previously obtaining a relation of the control-start vehicle speed relative to the deceleration (degree of decrease of the vehicle speed) from experiments or theoretic formula and by storing the relation as a control map and referring it. In some embodiments, the control-start vehicle speed is estimated based on the control map in which the deceleration of the vehicle and the control-start vehicle speed is in a proportional relation and thus it is set so that the higher the deceleration, the higher the control-start vehicle speed and the lower the deceleration, the lower the control-start vehicle speed.

As described above, since the assist-controller G can be configured to estimate a control-start vehicle speed which is a vehicle speed in which the engine rotational speed above the self-start rotational speed can be obtained by actuating the clutch 3 in the assist-start range and also decreases the engine rotational speed relative to the main shaft rotational speed (rotational speed of the output side (boxy member 17) of the clutch 3) by actuating the clutch 3 in response to the vehicle speed reaching the control-start vehicle speed during deceleration of the vehicle, it is possible to surely restart the engine in the assist-start range. Especially according to some embodiments, since the control-start vehicle speed can be estimated depending on the deceleration of the vehicle, it is possible to more surely and smoothly restart the engine E in the assist-start range.

According to some embodiments, since the assist-controller G is configured to increase an engine rotational speed above an self-start rotational speed by actuating the clutch 3 during deceleration and under the economic-running control of the vehicle, subject to an acceleration pedal operation of the vehicle when the engine rotational speed is in an assist-start range which is an engine rotational range lower than the self-start rotational speed Na and higher than a starter-start rotational speed Nb, it is possible to quickly restart the engine even if the acceleration pedal operation is done in the assist-start range and thus to improve its responsivity.

Especially according to some embodiments, since the clutch 3 switches a power transmitting system between a first power transmitting system for transmitting the driving power of the engine E to the wheels via the torque converter 1 and a second power transmitting system for transmitting the driving power of the engine E to the wheels without via the torque converter 1, and the assist-controller G increases the engine rotational speed above the self-start rotational speed Na by switching the power transmitting system to the second power transmitting system with actuating the clutch 3 when the vehicle is decelerated and fuel supply to the engine is stopped, in response to the acceleration pedal operation of the vehicle when the engine rotational speed is in the assist-start range, it is possible to quickly restart the engine E and to improve its responsiveness using the switching function of the first and second power transmitting systems by the clutch 3 even when the acceleration pedal operation is done in the assist-start range.

In addition, since the assist-controller G performs the restart of fuel supply to the engine E and simultaneous actuation of an ignition of the engine E after the clutch 3 has actuated in the assist-start range and before the engine rotational speed reaches the self-start rotational speed Na, it is possible to obtain an auxiliary driving power of the engine E while the engine E reaches the self-start rotational speed Na and thus to restart the engine E more quickly.

Figure 17:
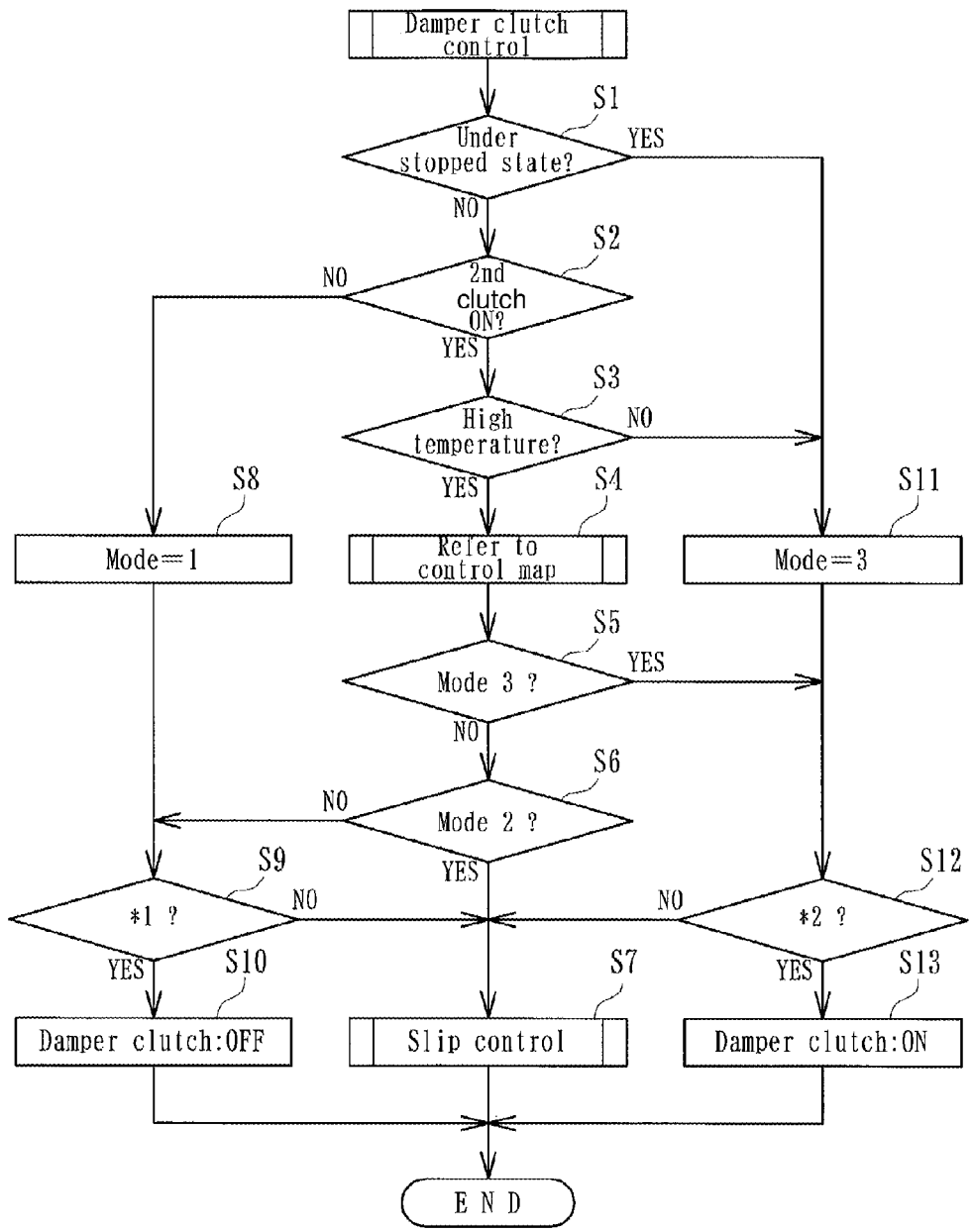
FIG. 17 is a flowchart showing contents of control of the spring property control means of the power transmitting apparatus of FIG. 1.

Then, process and/or steps of the control of the damper clutch 10 (i.e. contents of control of the spring property controller 14) of some embodiments are described below with reference to FIG. 17, which can be considered as representing a control routine that can be executed by the spring property controller 14.

Firstly, it is determined whether the vehicle is in a stopped state (S1). When it is determined that the vehicle is not in a stopped state, the control routine goes to step S2 and determines whether the second clutch 3b is actuated (i.e. whether it is in the second power transmitting system in which the driving power of the engine E is transmitted to the wheels D not via the torque converter 1). If the second clutch 3b is actuated and it is in the second power transmitting system, the control routine goes to step S3 and determines whether the temperature of hydraulic fluid is higher than a predetermined value.

If it is determined that temperature of hydraulic fluid is higher than a predetermined value at step S3, the control routine goes to step S4 and refers to the control map of FIG. 12. That is, the damper clutch 10 is switched between the high spring rate state and the low spring rate state depending on running state of the vehicle by switching of the damper clutch 10. As a result of the reference to the control map, a determination of whether it should be set to Mode 3 (S5) or a determination of whether it should be set to the Mode 2 (S6) is sequentially performed. When determined that it should be set to Mode 2 at step S6, the control routine goes to step S7 and performs a control of Mode 2 (i.e. the slip control).

On the other hand, as a result of the reference to the control map, if it is determined that it should be set to Mode 3 at step S5, the control routine goes to step S12 in which it is determined whether a predetermined time has passed from Mode 1. When it is determined that a predetermined time has passed, the control routine goes to step S13 and actuates the damper clutch 10 in accordance with the setting of the Mode 3 (i.e. moves the damper clutch 10 to the connected position) to obtain the high spring rate state. When it is determined at step S12 that a predetermined time has not passed from Mode 1 (i.e. a predetermined time has not passed from a change of running state of the vehicle), it goes to step S7 and performs the control of Mode 2 (slip control).

In addition, as a result of the reference to the control map, when determined that it should not be set to Mode 2 at step S6, the control routine goes to step S9 in which it is determined whether a predetermined time has passed ("1?") from Mode 3. When it is determined that a predetermined time has passed, the control routine goes to step S10 and does not actuate the damper clutch 10 in accordance with the setting of the Mode 1 (i.e. moves the damper clutch 10 to the separated position) to obtain the low spring rate state. When it is determined at step S9 that a predetermined time has not passed from Mode 3 (i.e. a predetermined time has not passed from a change of running state of the vehicle), it goes to step S7 and performs the control of Mode 2 (slip control).

Furthermore, when determined at step S2 that the second clutch 3b is not actuated and is in the first power transmitted system, the control routine goes to step S8 without referring to the control map and steps S9, S10 are sequentially performed after Mode 1 has set. Similarly, when it is determined that the temperature of the hydraulic fluid is lower than the predetermined value, the control routine goes to S11 without referring to the control map and steps S12, S13 are sequentially performed after Mode 3 has set at step S11.

Figure 18:
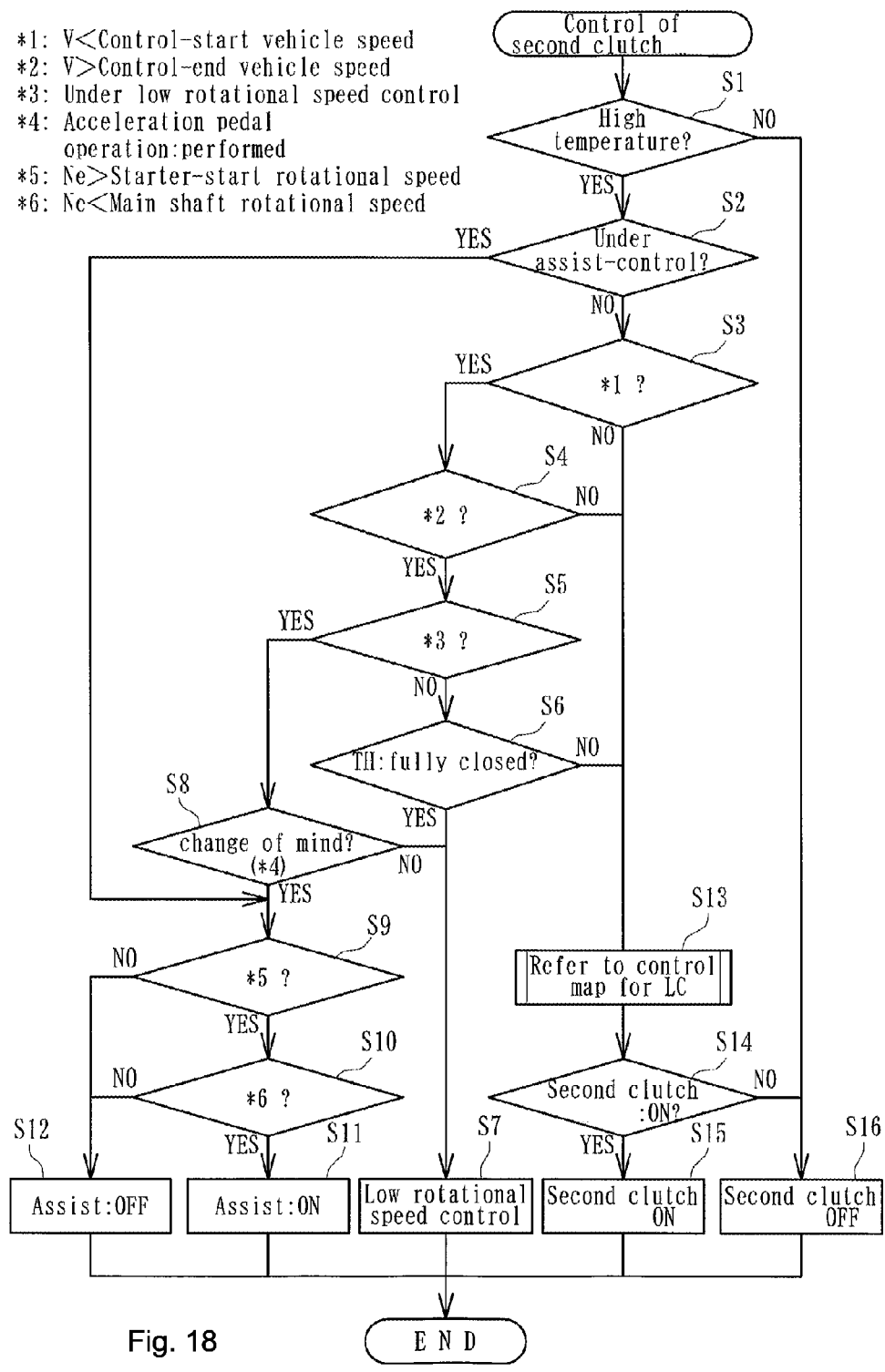
FIG. 18 is a flowchart showing contents of control of a second clutch means of the power transmitting apparatus of FIG. 1.

Then, contents of control of the second clutch (lock-up clutch: LC) 3b of some embodiments is described below with reference to the flowchart of FIG. 18, which can be considered as representing a control routine.

Firstly, it is determined whether the temperature of the hydraulic fluid is higher than a predetermined value (S1). When lower than the predetermined value, the control routine goes to step S16 to turn off the second clutch 3b (non-actuated state). When higher than the predetermined value, the control routine goes to step S2 and determines whether it is under the assist-control by the assist-controller G (control for increasing the engine rotational speed higher than the self-start rotational speed Na by actuating the clutch 3 to the second power transmitting system in response to acceleration pedal operation has been performed when reached the assist-start range during the economic-running control).

When determined that the assist-control has not been performed yet at step S2, the control routine goes to step S3 and determines whether the vehicle speed is lower than the control-start vehicle speed. When determined that the vehicle speed is lower than the control-start vehicle speed at step S3, the control routine goes to step S4 and determines whether the vehicle speed is higher than a control-finish vehicle speed. When the vehicle speed is higher than the control-finish vehicle speed, the control routine goes to step S5 and determines whether a low rotational speed control is performed (control performed during the economic-running control by the engine controller J and during the intervals II, III shown in FIG. 14).

When determined that the low rotational speed control is not performed at step S5, the control routine goes to step S6 and determines whether the throttle opening (TH) is under a fully closed state. When determined that the throttle opening is under the fully closed state, it goes to step S7 and performs the low rotational speed control. On the other hand, when determined that the engine E is under the low rotational speed control, the control routine goes to step S8 and determines whether the acceleration pedal operation has been performed. When determined that the acceleration pedal operation has been performed, the control routine goes to S9 and determines whether the engine rotational speed Ne is higher than the starter-start rotational speed Nb.

When determined that the engine rotational speed Ne is higher than the starter-start rotational speed Nb at step S9, the control routine goes to step S10 and determines whether the engine rotational speed Ne is lower than the main shaft rotational speed. When determined that the engine rotational speed Ne is lower than the main shaft rotational speed, the control routine goes to step S11 and performs the assist-control (assist: ON) by actuating the clutch means 3 and switching to the second power transmitting system.

When it is determined that the engine rotational speed Ne is not higher than the starter start rotational speed Nb at step S9 and that the engine rotational speed Ne is not lower than the main shaft rotational speed at step S10, the control routine goes to step S12 and stops the assist-control (assist: OFF). In addition, when determined that it is under the assist-control at step S2, the control routine goes to step S9 and performs steps S10 to S12 similarly to the description above. In this case, the assist-control is continuously performed at step S11.

On the other hand, when determined that the vehicle speed is not lower than the control-start vehicle speed at step S3, that the vehicle speed is not higher than the control-finish vehicle speed at step S4, and that the throttle opening (TH) is not fully closed at step S6, the control routine goes to step S13 and refers to a control map for the lock-up clutch (LC) i.e. second clutch 3b (e.g. map to which a control mode can refer depending on the running state of the vehicle). As a result of the reference to the control map, when determined that it is a control mode for actuating the second clutch 3b at step S14, the control routine goes to step S15 and actuates the second clutch 3b. As a result of the reference to the control map, when determined at step S14 that it is not a control mode for actuating the second clutch means 3b, the control routine goes to step S16 and turns the second clutch 3b to an OFF state (non-actuated state).

As described above, according to some embodiments, since the assist-controller G performs the assist-control by actuating the clutch 3 (second clutch 3b) in the assist-start range only when the temperature of the hydraulic fluid for actuating the clutch 3 (second clutch 3b) is higher than the predetermined value, it is possible to better prevent failure of the clutch 3 (second clutch 3b) when the temperature of the hydraulic fluid is low.

Figure 19:
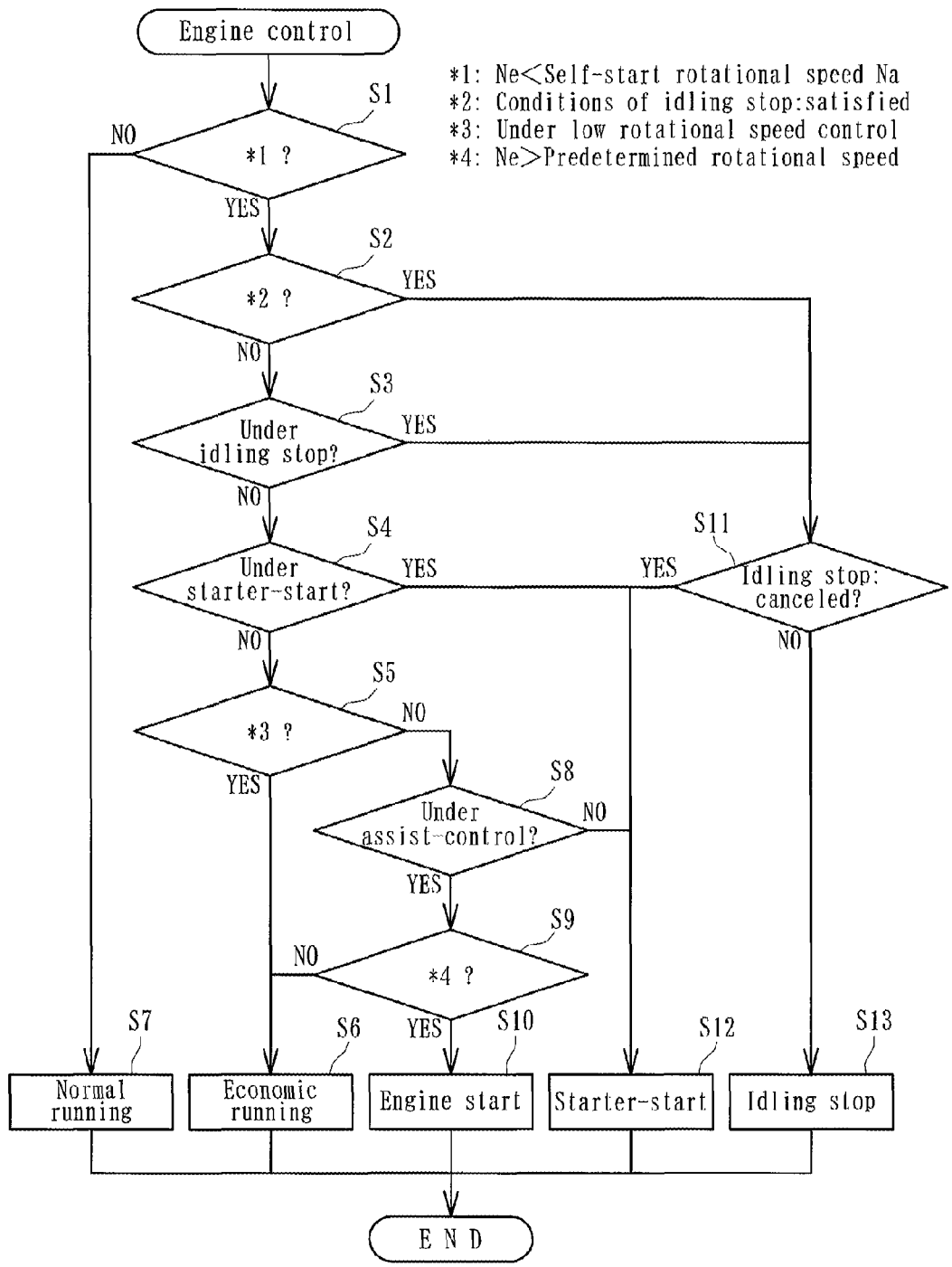
FIG. 19 is a flowchart showing contents of control of the engine of the power transmitting apparatus of FIG. 1.

Then, contents of control of the engine E of some embodiments will be described with reference to a flowchart of FIG. 19, which can be considered as representing a control routine.

Firstly, it is determined whether the engine rotational speed Ne is lower than the self-start rotational speed Na at step S1. When determined that the engine rotational speed Ne is lower than the self-start rotational speed Na, the control routine goes to step S2 and determines whether conditions for the idling stop (states for performing the idling stop when the vehicle is stopped) are satisfied. When it is determined that the engine rotational speed Ne is not lower than the self-start rotational speed Na, the control routine goes to step S7 and a control for normal driving is performed.

When it is determined that conditions for the idling stop are not satisfied at step S2, it goes to step S3 and determine whether the idling stop is performed. When determined that the idling stop is not performed, it goes to step S4 and determines whether the engine E is under an engine start state by the starter St. When determined that the engine E is not under the engine start state by the starter St at step S4, the control routine goes to step S5 determines whether it is under a low rotational speed control by the assist-controller G. When determined that it is under the low rotational speed control, the control routine goes to step S6 and performs the economic-running control (control to stop the fuel supply to the engine E and ignition by the igniter means).

On the other hand, when determined that conditions for the idling stop are satisfied at step S2 and that it is under the idling stop at step S3, the control routine goes to step S11 and determines whether the idling stop has been released due to, for example, an acceleration pedal operation. When determined that the idling stop has not been released yet, the control routine goes to step S13 and performs the idling stop. In addition, when determined that it is under the engine start state by the starter St at step S4 and that the idling stop has been released at step S11, the control routine goes to step S12 and performs the engine start by the starter St (when satisfying condition of step S4, the engine start by the starter St is continuously performed).

When it is determined that the low rotational speed control is not performed at step S5, the control routine goes to step S8 and determines whether the assist-control has been performed by the assist-control means G. When it is determined that the assist control has been performed at step S8, the control routine goes to step S9 and determines whether the engine rotational speed Ne is higher than a predetermined value which is an engine rotational speed intended to ignite the engine E with restarting fuel supply to the engine E at a timing after switching to the second power transmitting system with actuating the clutch 3 in the assist-start range and before reaching the self-start rotational speed Na.

When it is determined that the engine rotational speed Ne is higher than the predetermined rotational speed at step S9, the control routine goes to step S10 and restarts the engine E with performing fuel supply to the engine E and ignition by the igniting system of the engine E. On the other hand, when it is determined that the engine rotational speed Ne is not higher than the predetermined rotational speed at step S9, the control routine goes to step S6 and performs the economic-running control in which both the fuel supply to the engine E and ignition of the engine E are stopped. In addition, when it is determined that the assist-control has not been performed at step S8, the control routine goes to step S12 and starts the engine E by the starter St.

Figure 20:
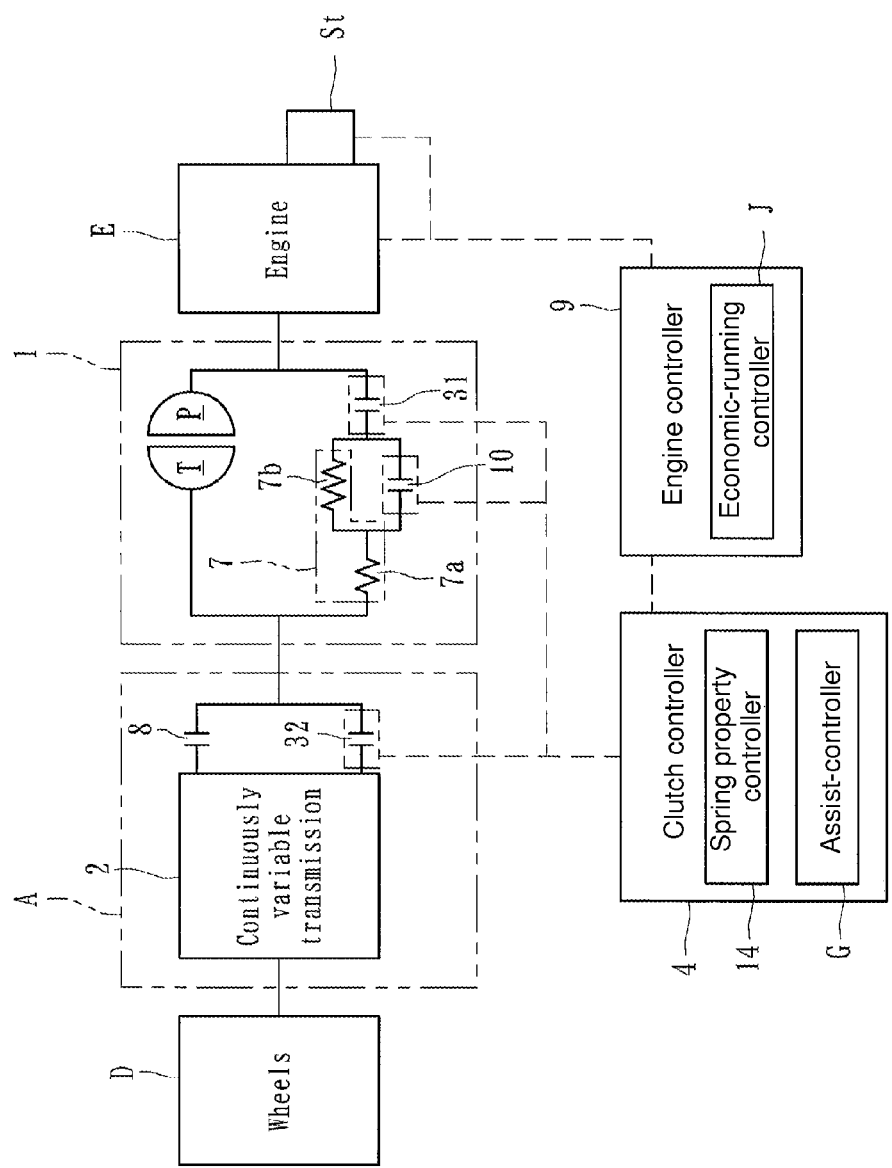
FIG. 20 is a schematic view showing basic concept of the power transmitting apparatus of another embodiment of the present invention.

Although it is described the power transmitting apparatus of some embodiments having the arrangement schematically shown in FIG. 2, it may be possible to arrange a clutch 31 (corresponding to the second clutch 3b of FIG. 2) for switching the first and second power transmitting systems within the torque converter 1 as shown FIG. 20. In this case, a separate clutch 32 for switching advance and reverse of the vehicle is arranged within the transmission A in parallel with the third clutch 8 at the upstream side of the continuously variable transmission 2. With the arrangement of the clutch 31 for switching the first and second power transmitting systems within the torque converter 1, it is possible to efficiently switch the first and second power transmitting systems and also to simplify structures outside of the torque converter 1.

In addition, although it is described that the engine rotational speed is reduced relative to the main shaft rotational speed (i.e. rotational speed of the output side (boxy member 17) of the clutch 3) by actuating the clutch 3 (second clutch 3b) when the vehicle speed reaches the control-start vehicle speed during reduction of the vehicle speed, it may be possible to reduce the engine rotational speed relative to the main shaft rotational speed by actuating the clutch 3 in response to a condition other than that the vehicle speed reaches the control-start vehicle speed. Furthermore, although it is described that the control-start vehicle speed is estimated depending on the deceleration of the vehicle, it may be possible to estimate the control-start vehicle speed depending on other parameters such as information from a navigation system, driving characters of a driver, running states of vehicles, etc.

In addition, the clutch used for switching to the second power transmitting system during assist-control performed by the assist-controller G is not limited to the clutch 3 of the illustrated embodiment and may be possible to use a lock-up clutch (LC) generally arranged within a torque converter. Furthermore, although it is described that the spring property controller 14 can have a function of switching the spring properties depending on the running states of a vehicle, it may be possible to use a spring property controller that does not have such a function.

Although it is described that the damper mechanism has at least two dampers including the first and second dampers 7a, 7b and the damper clutch 10 as spring property switching device can switch the first and second dampers 7a, 7b between the low spring rate state and the high spring rate state, other configurations can also be used where, for example, the damper mechanism includes three or more dampers and can switch them between plural spring rate states depending on the running state of a vehicle. The plural dampers may be those having different spring constants each other or having same spring constant and changeable their spring rate states between the low spring rate state and the high spring rate state by changing combination of them.

In addition, although it is described that the damper property switching device is formed of the damper clutch 10, it may be possible to use a switching device other than the clutch 10. Furthermore, the damper mechanism can be formed of single damper and a selectively changeable spring property with the damper property switching device being configured to change its support portions of the damper. The clutch can be formed of any structure able to switch the first power transmitting system for transmitting the driving power of the engine E to the wheels D via the torque converter 1 and the second power transmitting system for transmitting the driving power of the engine E to the wheels D without via the torque converter 1.

Figure 21:
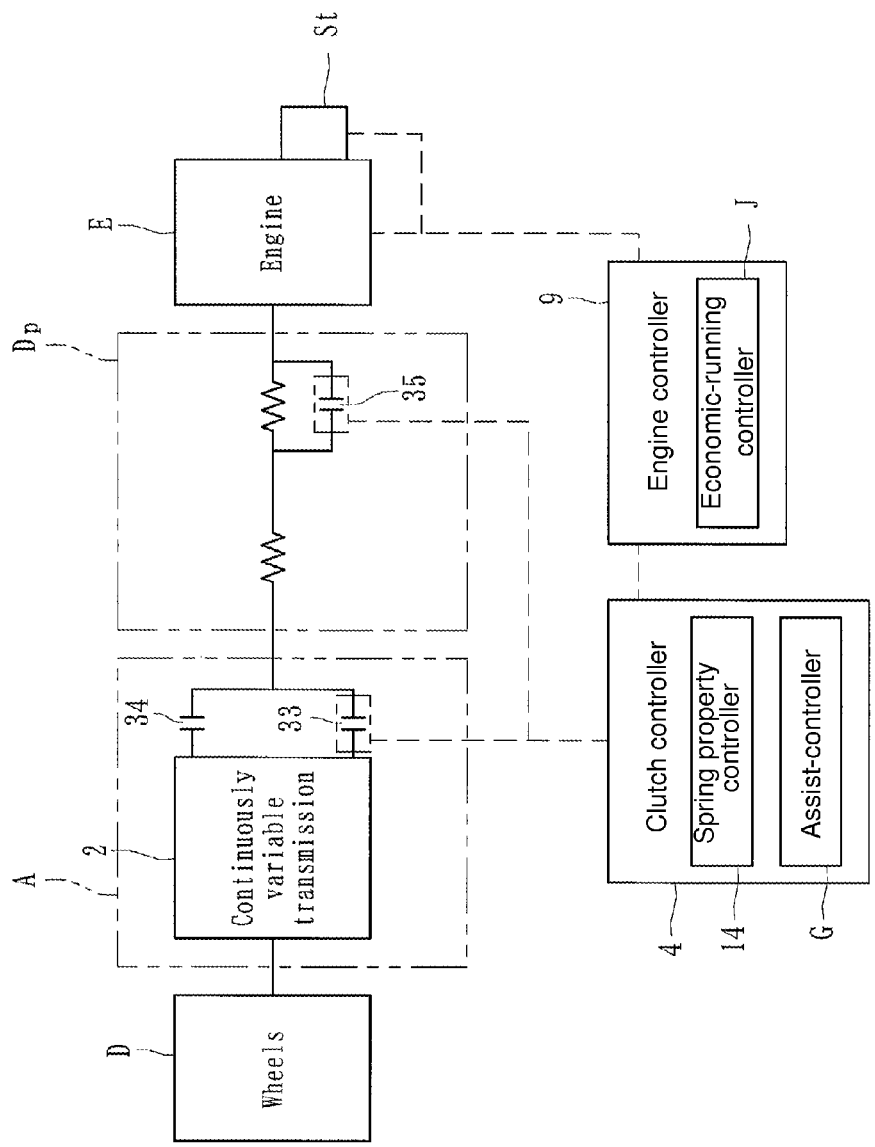
FIG. 21 is a schematic view showing basic concept of the power transmitting apparatus of further embodiment of the present invention.

Furthermore, the clutch is not limited to that which is able to switch the first power transmitting system for transmitting the driving power of the engine E to the wheels D via the torque converter 1 and the second power transmitting system for transmitting the driving power of the engine E to the wheels D without via the torque converter 1. For example as shown in FIG. 21, the clutch can comprise an advance clutch 33 disposed in the middle of the power transmitting system of the engine E. In FIG. 21, a reference numeral 34 denotes a reverse clutch disposed in the middle of the power transmitting system of the engine E, a reference numeral 35 denotes a damper clutch, and reference character Dp denotes a damper mechanism provided with the damper clutch 35.

The assist-controller G having such a structure can be configured to make the engine rotational speed higher than the self-start rotational speed by actuating the advance clutch 33 as a clutch means for connecting the power transmitting system of the engine E subject to that an acceleration pedal operation is performed when the engine rotational speed is in the assist-start range under a state in which fuel supply to the engine E is stopped during deceleration of the vehicle. This structure can be applied to a vehicle which does not have a torque converter 1.

The present inventions can be applied to any power transmitting apparatus irrespective of having a different external appearance or other additional functions if it is a power transmitting apparatus of a vehicle comprising an assist-control means and that the assist-control means increases an engine rotational speed above an self-start rotational speed by actuating the clutch means during the vehicle is decelerated and fuel supply to the engine is stopped, subject to an acceleration pedal operation of the vehicle when the engine rotational speed is in an assist-start range which is an engine rotational range lower than the self-start rotational speed in which the engine can be started if fuel supply is restarted and higher than a starter-start rotational speed in which the engine cannot be started even if fuel supply is restarted and can be started by a starter.

What is claimed is:

1. A power transmitting apparatus of a vehicle provided with a clutch means for selectively transmitting or cutting off a driving power of an engine to wheels, comprising:
   assist-control means for increasing an engine rotational speed above a self-start rotational speed by actuating the clutch means when the vehicle is decelerated and fuel supply to the engine is stopped, in response to the detection of an acceleration pedal operation of the vehicle when the engine rotational speed is in an assist-start range which is an engine rotational range lower than the self-start rotational speed in which the engine can be started if fuel supply is restarted and higher than a starter-start rotational speed in which the engine cannot be started even if fuel supply is restarted and can be started by a starter.

2. A power transmitting apparatus of claim 1, wherein the power transmitting apparatus further comprises a torque converter, wherein the clutch means switches a power transmitting system between a first power transmitting system for transmitting the driving power of the engine to the wheels via the torque converter and a second power transmitting system for transmitting the driving power of the engine to the wheels without via the torque converter, and wherein the assist-control means increases the engine rotational speed above the self-start rotational speed by switching the power transmitting system to the second power transmitting system with actuating the clutch means when the vehicle is decelerated and fuel supply to the engine is stopped, in response to acceleration pedal operation of the vehicle when the engine rotational speed is in the assist-start range.

3. A power transmitting apparatus of claim 1 wherein the assist-control means estimates a control-start vehicle speed which is a vehicle speed in which the engine rotational speed above the self-start rotational speed can be obtained by actuating the clutch means in the assist-start range and also decreases the engine rotational speed by actuating the clutch means when the vehicle speed has reached the control-start vehicle speed during deceleration of the vehicle.

4. A power transmitting apparatus of claim 3, wherein the control-start vehicle speed is estimated depending on the deceleration of the vehicle.

5. A power transmitting apparatus of claim 3, wherein the power transmitting apparatus comprises a damper mechanism comprising at least first and second dampers having spring properties for damping the torque variation and disposed in the middle of the power transmitting system of the engine, the apparatus further comprising a spring property switching means for switching the spring properties of the damper mechanism, a spring property control means for actuating the spring property switching means to switch the spring properties depending on a running state of the vehicle, and wherein the spring constant of the damper mechanism can be switched between a low spring rate state and a high spring rate state and the assist-control means switches the spring properties to the high spring rate state when the vehicle has reached the control-start vehicle speed.

6. A power transmitting apparatus of claim 5, wherein the spring constant of the damper mechanism is switched depending on the throttle opening of the engine when the acceleration pedal operation is performed in the assist-start engine speed range.

7. A power transmitting apparatus of claim 1, wherein the clutch means is configured for slip control for slipping the clutch in the process of switching the connection and the cutting-off of the power transmission systems of the engine and is slip-controlled in the assist start range.

8. A power transmitting apparatus of claim 1, wherein the assist-control means performs the restart of fuel supply to the engine and simultaneous actuation of an ignition means of the engine after the clutch means has been actuated in the assist-start range and before the engine rotational speed reaches the self-start rotational speed.

9. A power transmitting apparatus of claim 1, wherein the assist-control means actuates the clutch in the assist-start range only when the temperature of hydraulic fluid for actuating the clutch means is higher than a predetermined temperature.

10. A power transmitting apparatus of claim 1, wherein a transmission is disposed in the middle of the power transmitting system from the engine to the wheels and the transmission is an automatic variable speed transmission.

11. A power transmitting apparatus of claim 10, wherein the automatic variable speed transmission is a continuously variable transmission.

* * * * *